US012496525B2

(12) United States Patent
Fukada et al.

(10) Patent No.: US 12,496,525 B2

(45) Date of Patent: Dec. 16, 2025

(54) SYSTEMS AND METHODS OF PRODUCING ASSEMBLED OBJECTS WITHIN A VIRTUAL SPACE

(71) Applicant: NINTENDO CO., LTD., Kyoto (JP)

(72) Inventors: Naoki Fukada, Kyoto (JP); Tadashi Sakamoto, Kyoto (JP); Haruki Sato, Kyoto (JP); Yuya Sato, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 336 days.

(21) Appl. No.: 18/302,336

(22) Filed: Apr. 18, 2023

(65) Prior Publication Data

US 2023/0277940 A1 Sep. 7, 2023

Related U.S. Application Data

(63) Continuation of application No. PCT/JP2022/009229, filed on Mar. 3, 2022.

(51) Int. Cl.

| | |
|---|---|
| ***A63F 13/63*** | (2014.01) |
| ***A63F 13/50*** | (2014.01) |
| ***A63F 13/55*** | (2014.01) |

(52) U.S. Cl.

CPC .............. *A63F 13/63* (2014.09); *A63F 13/50* (2014.09); *A63F 13/55* (2014.09)

(58) Field of Classification Search

None

See application file for complete search history.

(56) References Cited

U.S. PATENT DOCUMENTS

| | | | |
|---|---|---|---|
| 2005/0024360 | A1 | 2/2005 | Abe et al. |
| 2019/0118093 | A1 | 4/2019 | Sensui et al. |

FOREIGN PATENT DOCUMENTS

| | | | |
|---|---|---|---|
| JP | 2005038303 | A | 2/2005 |
| JP | 2010231364 | A | 10/2010 |
| JP | 2018102745 | A | 7/2018 |
| JP | 2019076190 | A | 5/2019 |

OTHER PUBLICATIONS

LEGO Star Wars The Force Awakens—Part 1—Luke Skywalker (HD,) Youtube video, <URL:https://www.youtube.com/watch?v=S0OxEKhCA80> (Year: 2016). 1 page.*

"Lego Star Wars: The Force Awakens", Wikipedia article, <URL:https://en.wikipedia.org/w/index.php?title=Lego_Star_Wars:_The_Force_Awakens&oldid=1071311644> (Year: 2022). 6 pages.*

Chiropino, I operated on a cow without permission and made a major remodeling into a new animal! [Minecraft] [Micra Relay2021] [Gameplay], YouTube [online] [video], Dec. 28, 2021, https://www.youtube.com/watch?v=kDYWIY7qWAM, mainly 0:28-5:40, searched on Apr. 7, 2022 with explanation in English.

(Continued)

*Primary Examiner* — Lawrence S Galka

(74) *Attorney, Agent, or Firm* — Nixon & Vanderhye P.C.

(57) ABSTRACT

A region is set in a virtual space, based on a user's operation. A material object is moved in the virtual space, based on the user's operation. A product relating to a plurality of the material objects is caused to appear with at least a portion of the product included in the region, using at least the material objects having at least a portion included in the region.

25 Claims, 14 Drawing Sheets

(56) References Cited

OTHER PUBLICATIONS

88 Gaming Gen, New Merge Puzzle Merge County (Tutorial), YouTube [online] [video], Nov. 28, 2021, https://www. youtube. com/watch?v=s7RreDo_xpc.

International Search Report for PCT/JP2022/009229, mailed Apr. 17, 2022, 4 pages.

Jan. 5, 2024 Office Action issued in Japanese Patent Application No. 2023-523123, pp. 1-7 [machine translation included].

Game "LEGO Star Wars: The Force Awakens" play video on sale, YouTube [online] [video], Japan Patent Office, Nov. 18, 2016, [search date Dec. 20, 2023], https://www.youtube.com/watch?v=kpOkKcLTCjk, 3:25-5:10, pp. 1-8.

* cited by examiner

SYSTEMS AND METHODS OF PRODUCING ASSEMBLED OBJECTS WITHIN A VIRTUAL SPACE

CROSS REFERENCE TO RELATED APPLICATIONS

This application is a continuation of International Patent Application PCT/JP2022/009229, filed on Mar. 3, 2022, the entire contents of which are hereby incorporated herein by reference.

FIELD

The technology disclosed herein relates to a storage medium storing a game program, game apparatus, game system, and game processing method for performing a process of producing a product in a virtual space.

BACKGROUND AND SUMMARY

There is conventionally a game apparatus for executing a game process of allowing a player character to obtain materials in a virtual space and temporarily store the materials, and use the temporarily stored materials to produce a product such as a virtual object.

However, in the above game apparatus, not considered is how a product is produced when materials exist in a virtual space without being stored.

Under these circumstances, it is an object of the present non-limiting example to provide a storage medium storing a game program, game apparatus, game system, and game processing method that are capable of producing a product using a material in a virtual space.

To achieve the above object, the present non-limiting example may have the following configurations, for example.

A non-limiting example configuration of a non-transitory computer-readable storage medium according to the present non-limiting example has stored therein a game program is executed by a computer included in an information processing apparatus. The game program causes the computer to execute: setting a region in a virtual space, based on a user's operation; moving a material object in the virtual space, based on the user's operation; and causing a product relating to a plurality of the material objects to appear with at least a portion of the product included in the region, using at least the material objects having at least a portion included in the region.

With the above configuration, a material object included in a region set in the virtual space by the user is used, and therefore, a product can be caused to appear with game aspects maintained. In addition, the region is a virtual space region in which a material object can be appropriately disposed, and therefore, a product to be caused to appear is also highly likely to be appropriately disposed, resulting in excellent usability.

The product may be an assembled object obtained by putting the plurality of material objects together.

With the above configuration, a correspondence relationship between a plurality of material object and a product can be easily recognized by the user.

The game program may further cause the computer to execute: producing the assembled object by putting the plurality of material objects together, based on the user's operation.

With the above configuration, an assembled object obtained by putting a plurality of material objects together can be produced based on the user's operation.

The game program may further cause the computer to execute: setting the produced assembled object as the product allowed to appear.

With the above configuration, it is easy to reproduce an assembled object produced by putting a plurality of material objects together.

The assembled object may be automatically set as the product.

With the above configuration, an assembled object produced based on the user's operation is automatically set as a product, resulting in excellent usability.

A first number of the products may be allowed to be set, and when the produced assembled object is automatically newly set as the product, then if the first number is exceeded, a relatively early set one of the products already set may be automatically deleted.

With the above configuration, a limit can be set on the capacity of storage for automatically newly setting an assembled object as a product. In addition, reproduction or duplication of an assembled object recently produced is likely to be desired by the user, and therefore, if a relatively early product is automatically deleted, excellent usability is achieved.

In addition, one from the products already set may be allowed to be set as a particular product, based on the user's operation, and when the product is newly set, then even if the first number is exceeded, the particular product may continue to be set.

With the above configuration, a product that the user does not desire to delete continues to be set, and a product that may be deleted is automatically deleted, resulting in excellent usability.

In addition, when the user obtains an item in a game, a product relating to the item may be set as the product allowed to appear.

With the above configuration, the amusingness of a game is increased by searching for or obtaining an item. In addition, for example, the user learns how material objects are put together, from a product caused to appear, and therefore, can assemble or modify a product on their own, resulting in an increase in the amusingness of a game.

In addition, the produced assembled object may, when designated by the user, be set as the product allowed to appear.

With the above configuration, for example, when the user puts a plurality of material objects together in sequence to produce an assembled object, then if the user designates an assembled object that is in a progress state desired by the user, the assembled object in that progress state is easily reproduced.

In addition, of objects included in the region, the material object that is used to cause the product to appear may be displayed in a manner such that the material object is distinguishable.

With the above configuration, a material object that is used in a region in a virtual space in production of a product can be presented to the user in an easy-to-understand manner.

In addition, an image showing the product to be caused to appear obtained by putting a plurality of material objects together may be displayed in the region.

With the above configuration, a product to be caused to appear can be presented to the user in an easy-to-understand manner.

In addition, of the plurality of material objects constituting the displayed product to be caused to appear, a missing material object for the displayed product to be caused to appear may be displayed in a manner such that the missing material object is distinguishable.

With the above configuration, a missing material object for production of a product can be clearly indicated.

In addition, when there are not enough material objects to constitute the product to be caused to appear, the product to be caused to appear may be caused to appear with the material objects of the product to be caused to appear excluding a missing material object, put together in a same manner as when all the material objects of the product to be caused to appear are put together.

With the above configuration, a product for which a material object(s) is missing is caused to appear, and therefore, the state of missing can be presented to the user. In addition, an assembled object produced without a missing material object(s) is caused to appear, and can be used to produce another assembled object.

In addition, the material objects may include a storable object that a player character operated by the user is allowed to temporarily store as a stored object, and a non-storable object that the player character is not allowed to temporarily store as the stored object.

With the above configuration, the player character can produce a product using a non-storable object that cannot be temporarily stored as a stored object. In addition, the reasonableness of a game is ensured by providing the right to possess or control a non-storable object, whereby a product can be produced using the non-storable object while maintaining game aspects.

In addition, the product may be caused to appear using the material object having at least a portion included in the region and a stored object temporarily stored by a player character operated by the user.

With the above configuration, a product can be caused to appear using a variety of objects.

In addition, when a same object is present both among the material objects having at least a portion included in the region and among the stored objects, the product may be caused to appear using the same object that is among the material objects having at least a portion included in the region with higher priority.

With the above configuration, when the user desires to continue to store a stored object, then if a stored object is used with higher priority, it is necessary to perform a procedure of obtaining the same object as the stored object used, from the virtual space, and storing that object again. However, if an object included in the region is used with higher priority, the time and effort to bring an object into the stored state can be removed.

In addition, a player character operated by the user may be disposed in the virtual space. In this case, the material object may be moved in the virtual space, based on the user's operation performed on the player character. The game program may further cause the computer to execute: producing the assembled object by putting the plurality of material objects together, based on the movement.

With the above configuration, an assembled object produced by a player character using a plurality of material objects can be caused to appear.

In addition, when a player character operated by the user is disposed on a ground, the region may be set on the ground in front of the player character. When the player character is disposed on the ground, the product may be caused to appear in the region in front of the player character. When the player character is disposed in the air, the product may be caused to appear below the player character.

With the above configuration, a product can be caused to appear on a ground in front of a player character in the virtual space. A product can be caused to appear below a player character even when the player character is in the air in the virtual space. Thus, a product can be caused to appear at a position where the product is easily used while using material objects from the virtual space.

In addition, the present non-limiting example may be carried out in the form of a game apparatus, a game system, and a game processing method.

According to the present non-limiting example, a product can be produced using materials in a virtual space.

These and other objects, features, aspects and advantages of the present exemplary embodiment will become more apparent from the following detailed description of the present exemplary embodiment when taken in conjunction with the accompanying drawings.

DETAILED DESCRIPTION OF NON-LIMITING EXAMPLE EMBODIMENTS

A game system according to the present non-limiting example will now be described. A non-limiting example of a game system 1 according to the present non-limiting example includes a main body apparatus (information processing apparatus serving as the main body of a game apparatus in the present non-limiting example) 2, a left controller 3, and a right controller 4. The left controller 3 and the right controller 4 are attachable to and detachable from the main body apparatus 2. That is, the user can attach the left controller 3 and the right controller 4 to the main body apparatus 2, and use them as a unified apparatus. The user can also use the main body apparatus 2 and the left controller 3 and the right controller 4 separately from each other (see FIG. 2). In the description that follows, a hardware configuration of the game system 1 of the present non-limiting example is described, and thereafter, the control of the game system 1 of the present non-limiting example is described.

Figure 1:
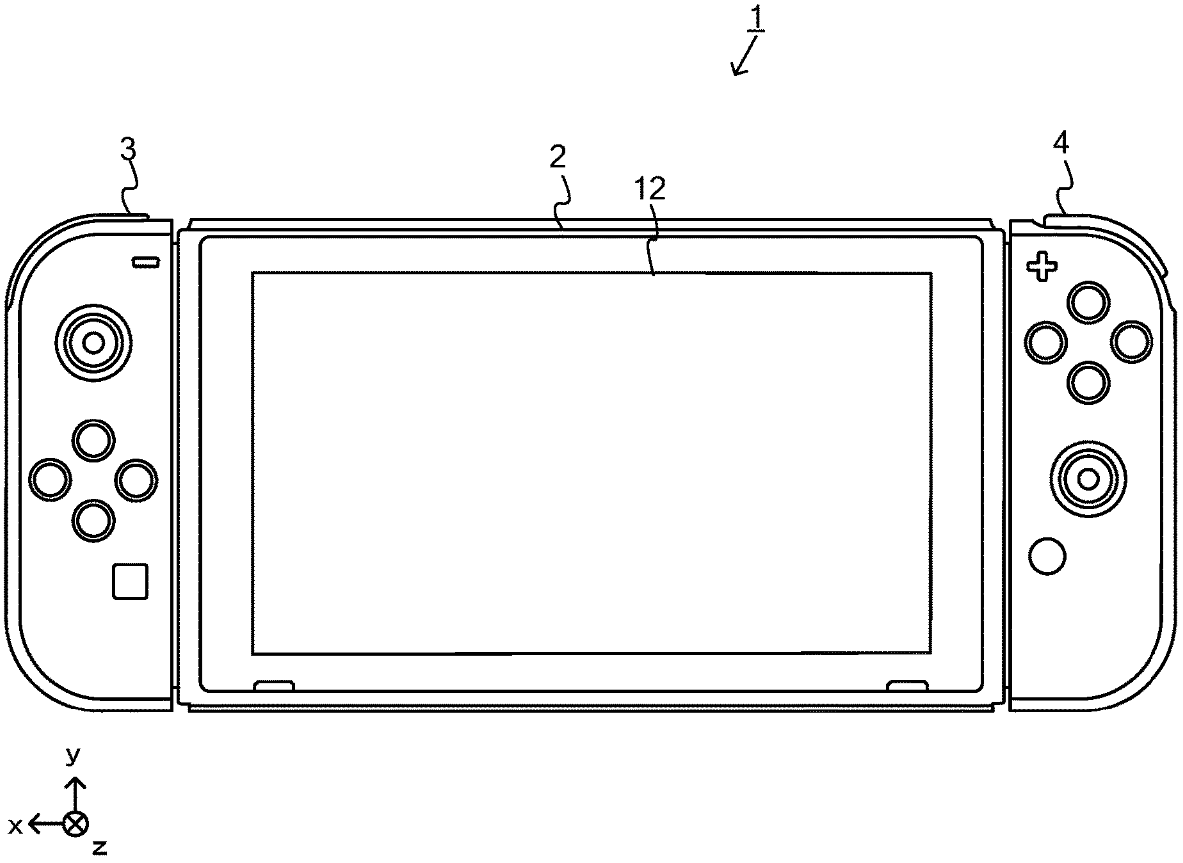
FIG. 1 is a diagram showing a non-limiting example of a state where a left controller 3 and a right controller 4 are attached to a main body apparatus 2.

FIG. 1 is a diagram showing a non-limiting example of the state where the left controller 3 and the right controller 4 are attached to the main body apparatus 2. As shown in FIG. 1, each of the left controller 3 and the right controller 4 is attached to and unified with the main body apparatus 2. The main body apparatus 2 is an apparatus for performing various processes (e.g., game processing) in the game system 1. The main body apparatus 2 includes a display 12. Each of the left controller 3 and the right controller 4 is an apparatus including operation sections with which a user provides inputs.

Figure 2:
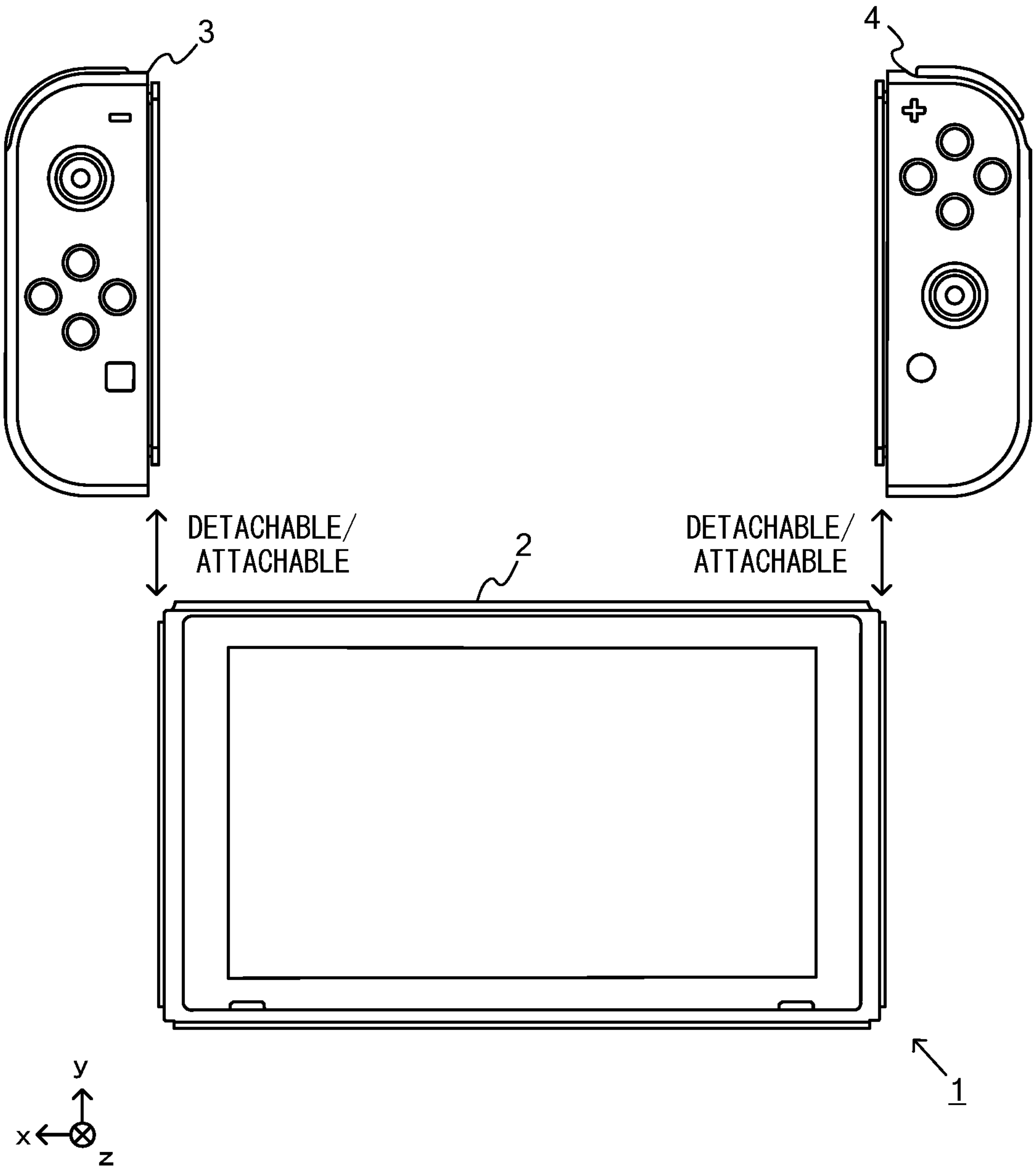
FIG. 2 is a diagram showing a non-limiting example of a state where each of the left controller 3 and the right controller 4 are detached from the main body apparatus 2.

FIG. 2 is a diagram showing a non-limiting example of the state where each of the left controller 3 and the right controller 4 is detached from the main body apparatus 2. As shown in FIGS. 1 and 2, the left controller 3 and the right controller 4 are attachable to and detachable from the main body apparatus 2. It should be noted that hereinafter, the left controller 3 and the right controller 4 will occasionally be referred to collectively as a "controller."

Figure 3:
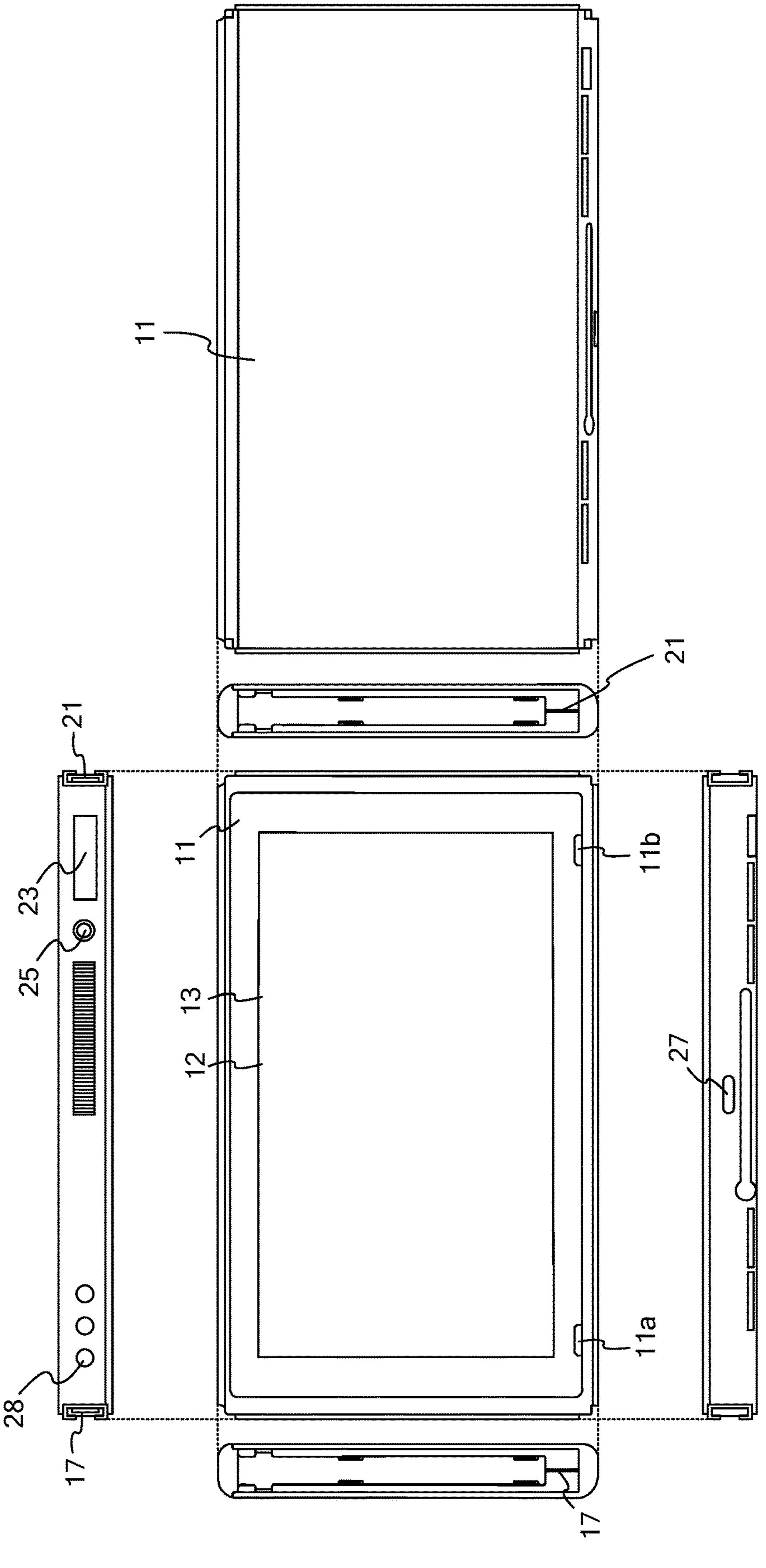
FIG. 3 is six orthogonal views showing a non-limiting example of the main body apparatus 2.

FIG. 3 is six orthogonal views showing a non-limiting example of the main body apparatus 2. As shown in FIG. 3, the main body apparatus 2 includes an approximately plate-shaped housing 11. In this non-limiting example, a main surface (in other words, a surface on a front side, i.e., a surface on which the display 12 is provided) of the housing 11 has a generally rectangular shape.

In addition, the main body apparatus 2 includes a touch panel 13 on the screen of the display 12. In this non-limiting example, the touch panel 13 allows multi-touch input (e.g., a capacitive touch panel). It should be noted that the touch panel 13 may be of any suitable type, e.g., it allows single-touch input (e.g., a resistive touch panel).

As shown in FIG. 3, the main body apparatus 2 includes a slot 23. The slot 23 is provided on an upper side surface of the housing 11. The slot 23 is so shaped as to allow a predetermined type of storage medium to be attached to the slot 23. The predetermined type of storage medium is, for example, a dedicated storage medium (e.g., a dedicated memory card) for the game system 1 and an information processing apparatus of the same type as the game system 1. The predetermined type of storage medium is used to store, for example, data (e.g., saved data of an application or the like) used by the main body apparatus 2 and/or a program (e.g., a program for an application or the like) executed by the main body apparatus 2. Further, the main body apparatus 2 includes a power button 28.

The main body apparatus 2 includes a lower-side terminal 27. The lower-side terminal 27 allows the main body apparatus 2 to communicate with a cradle. In this non-limiting example, the lower-side terminal 27 is a USB connector (more specifically, a female connector). When the unified apparatus or the main body apparatus 2 alone is placed on the cradle, the game system 1 can display, on a stationary monitor, an image that is generated and output by the main body apparatus 2. Also, in this non-limiting example, the cradle has the function of charging the unified apparatus or the main body apparatus 2 alone, being placed thereon. The cradle also functions as a hub device (specifically, a USB hub).

Figure 4:
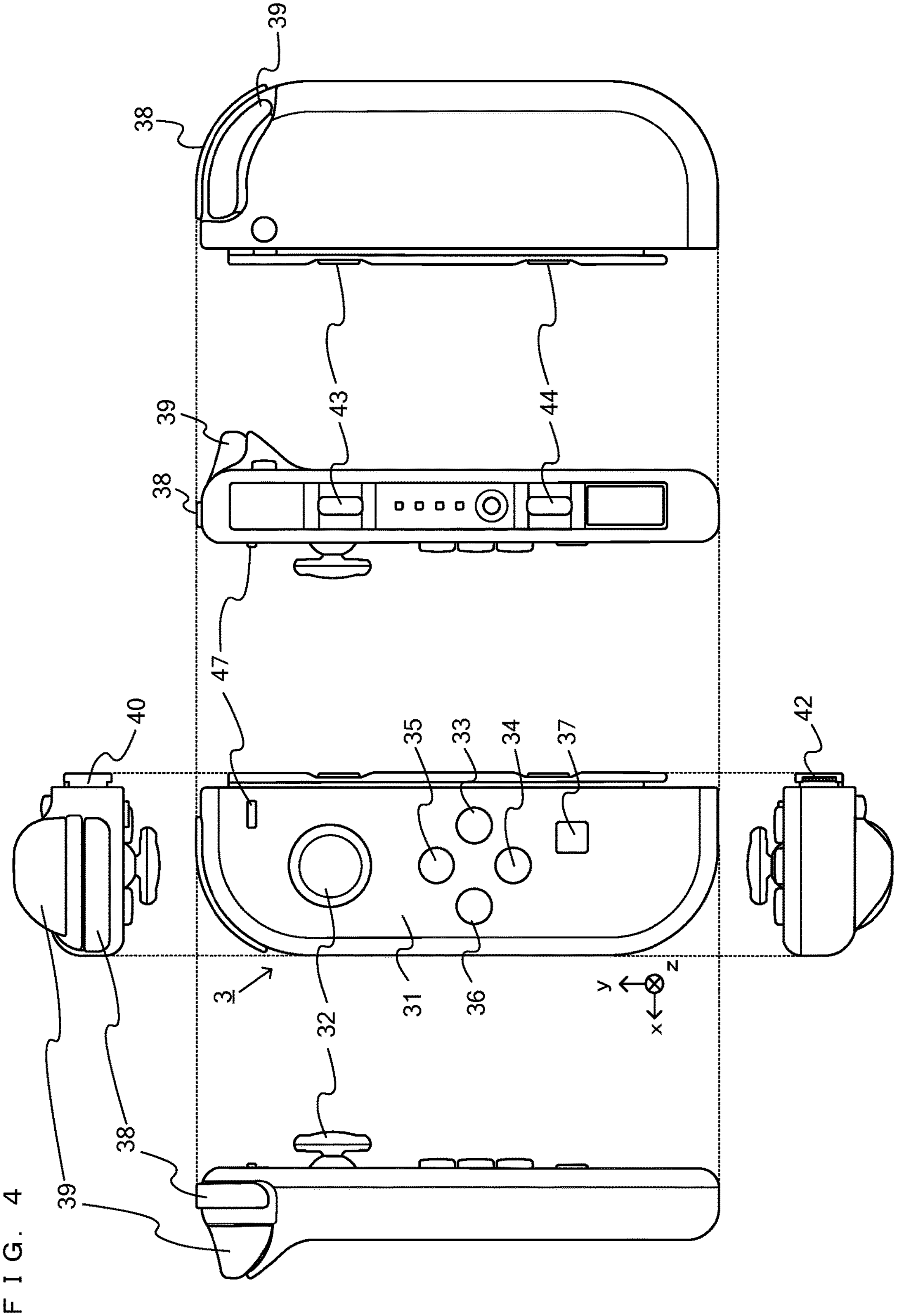
FIG. 4 is six orthogonal views showing a non-limiting example of the left controller 3.

FIG. 4 is six orthogonal views showing a non-limiting example of the left controller 3.

The left controller 3 includes an analog stick 32. As shown in FIG. 4, the analog stick 32 is provided on a main surface of the housing 31. The analog stick 32 can be used as a direction input section with which a direction can be input. The user tilts the analog stick 32 and thereby can input a direction corresponding to the direction of the tilt (and input a magnitude corresponding to the angle of the tilt). It should be noted that the left controller 3 may include a directional pad, a slide stick that allows a slide input, or the like as the direction input section, instead of the analog stick. Further, in this non-limiting example, it is possible to provide an input by pressing the analog stick 32.

The left controller 3 includes various operation buttons. The left controller 3 includes four operation buttons 33 to 36 (specifically, a right direction button 33, a down direction button 34, an up direction button 35, and a left direction button 36) on the main surface of the housing 31. Further, the left controller 3 includes a record button 37 and a "—" (minus) button 47. The left controller 3 includes a first L-button 38 and a ZL-button 39 in an upper left portion of a side surface of the housing 31. Further, the left controller 3 includes a second L-button 43 and a second R-button 44, on the side surface of the housing 31 on which the left controller 3 is attached to the main body apparatus 2. These operation buttons are used to give instructions depending on various programs (e.g., an OS program and an application program) executed by the main body apparatus 2.

The left controller 3 also includes a terminal 42 that enables wired communication between the left controller 3 and the main body apparatus 2.

Figure 5:
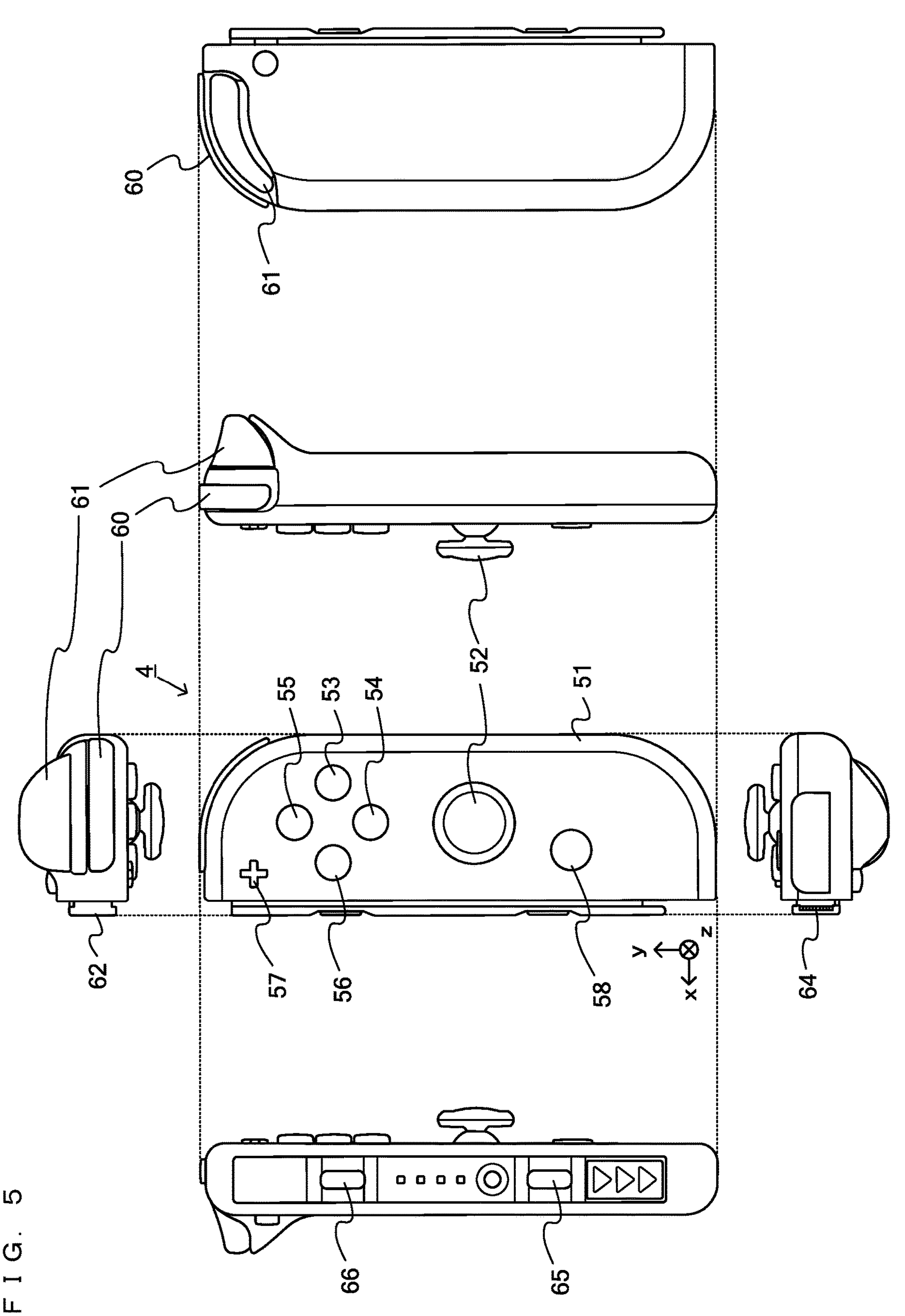
FIG. 5 is six orthogonal views showing a non-limiting example of the right controller 4.

FIG. 5 is six orthogonal views showing a non-limiting example of the right controller 4. The left controller 3 and the right controller 4 basically share a common configuration, and therefore, the right controller 4 will not be described in detail.

Figure 6:
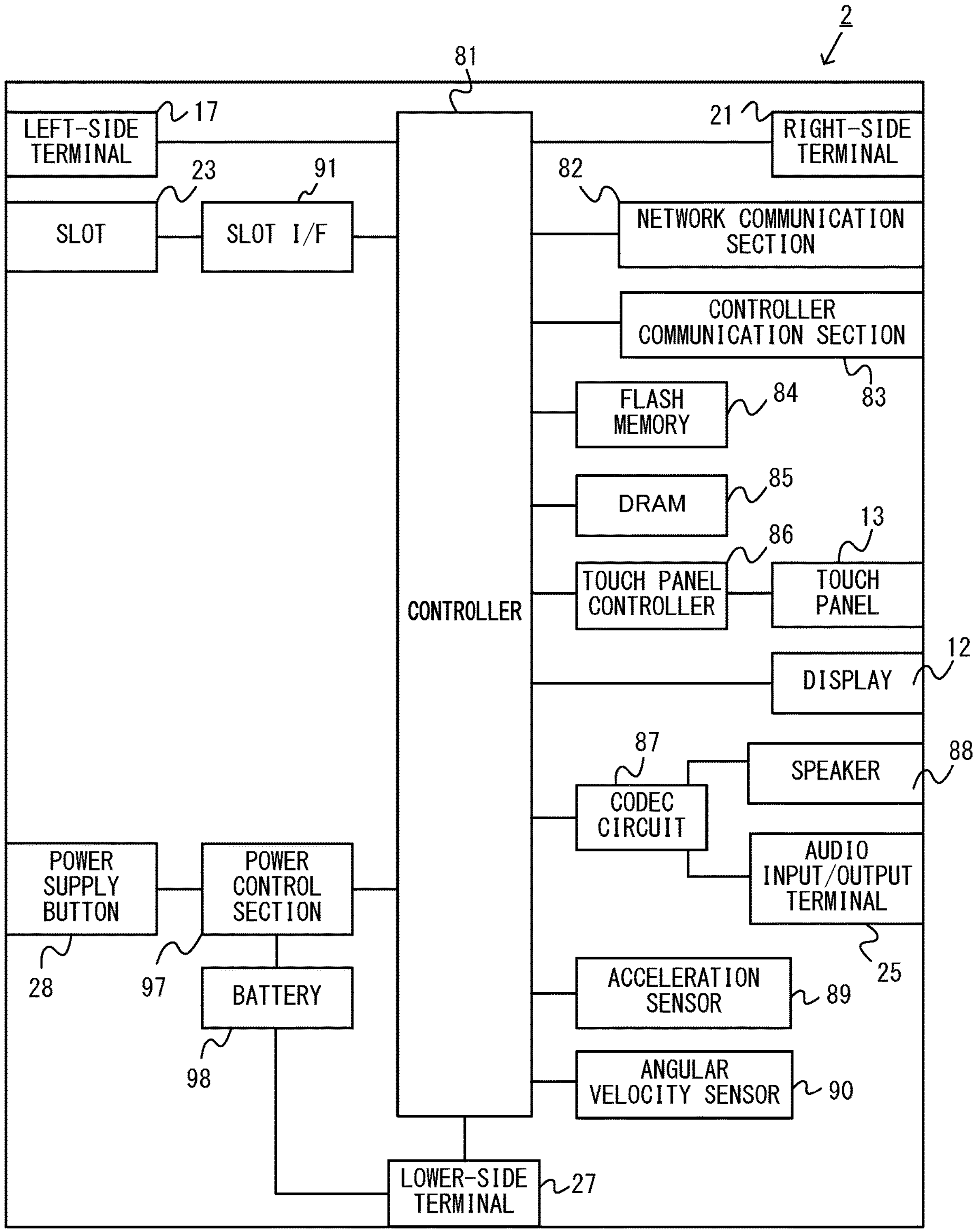
FIG. 6 is a block diagram showing a non-limiting example of an internal configuration of the main body apparatus 2.

FIG. 6 is a block diagram showing a non-limiting example of an internal configuration of the main body apparatus 2. The main body apparatus 2 includes components 81 to 91, 97, and 98 shown in FIG. 6 in addition to the components shown in FIG. 3. Some of the components 81 to 91, 97, and 98 may be implemented as electronic parts on an electronic circuit board, which is contained in the housing 11.

The main body apparatus 2 includes a processor 81. The processor 81 is an information processor for executing various types of information processing to be executed by the main body apparatus 2. For example, the CPU 81 may include only a central processing unit (CPU), or may be a system-on-a-chip (SoC) having a plurality of functions such as a CPU function and a graphics processing unit (GPU) function. The processor 81 executes an information processing program (e.g., a game program) stored in a storage section (specifically, an internal storage medium such as a flash memory 84, an external storage medium that is attached to the slot 23, or the like), thereby executing the various types of information processing.

The main body apparatus 2 includes a flash memory 84 and a dynamic random access memory (DRAM) 85 as examples of internal storage media built in itself. The flash memory 84 and the DRAM 85 are connected to the CPU 81. The flash memory 84 is mainly used to store various data (or programs) to be saved in the main body apparatus 2. The DRAM 85 is used to temporarily store various data used in information processing.

The main body apparatus 2 includes a slot interface (hereinafter abbreviated to "I/F") 91. The slot I/F 91 is connected to the processor 81. The slot I/F 91 is connected to the slot 23, and reads and writes data from and to a predetermined type of storage medium (e.g., a dedicated memory card) attached to the slot 23, in accordance with commands from the processor 81.

The processor 81 reads and writes, as appropriate, data from and to the flash memory 84, the DRAM 85, and each of the above storage media, thereby executing the above information processing.

The main body apparatus 2 includes a controller communication section 83. The controller communication section 83 is connected to the processor 81. The controller communication section 83 wirelessly communicates with the left controller 3 and/or the right controller 4. The main body apparatus 2 may communicate with the left and right controllers 3 and 4 using any suitable communication method. In this non-limiting example, the controller communication section 83 performs communication with the left and right controllers 3 and 4 in accordance with the Bluetooth (registered trademark) standard.

The processor 81 is connected to the left-side terminal 17, the right-side terminal 21, and the lower-side terminal 27. When performing wired communication with the left controller 3, the processor 81 transmits data to the left controller 3 via the left-side terminal 17 and also receives operation data from the left controller 3 via the left-side terminal 17. Further, when performing wired communication with the right controller 4, the processor 81 transmits data to the right controller 4 via the right-side terminal 21 and also receives operation data from the right controller 4 via the right-side terminal 21. Further, when communicating with the cradle, the processor 81 transmits data to the cradle via the lower-side terminal 27. As described above, in this non-limiting example, the main body apparatus 2 can perform both wired communication and wireless communication with each of the left and right controllers 3 and 4. Further, when the unified apparatus obtained by attaching the left and right controllers 3 and 4 to the main body apparatus 2 or the main body apparatus 2 alone is attached to the cradle, the main body apparatus 2 can output data (e.g., image data or sound data) to a stationary monitor or the like via the cradle.

Further, the display 12 is connected to the processor 81. The processor 81 displays, on the display 12, a generated image (e.g., an image generated by executing the above information processing) and/or an externally obtained image.

The main body apparatus 2 also includes an acceleration sensor 89 and an angular acceleration sensor 90.

Figure 7:
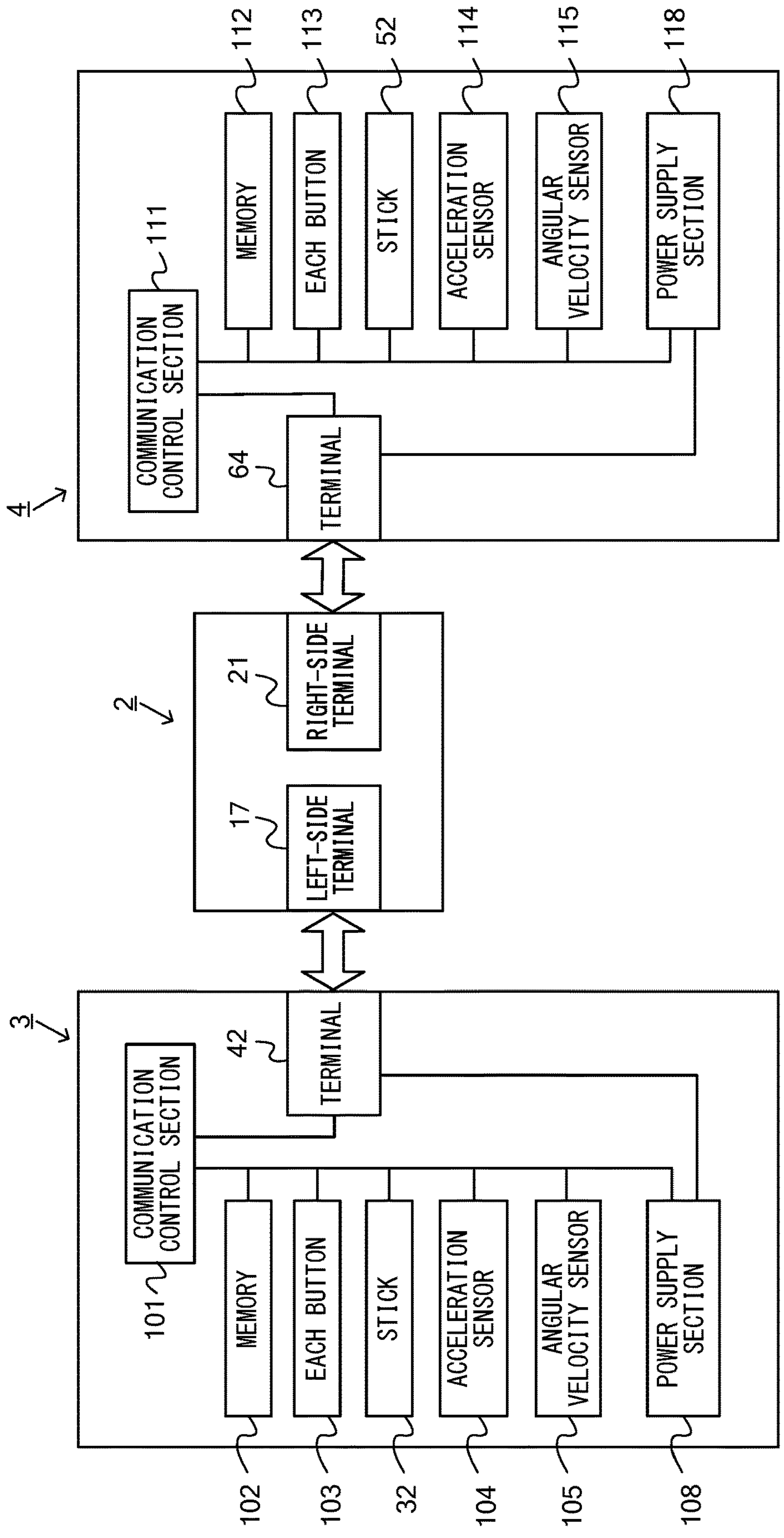
FIG. 7 is a block diagram showing examples of internal configurations of the main body apparatus 2, the left controller 3, and the right controller 4.

FIG. 7 is a block diagram showing non-limiting examples of the internal configurations of the main body apparatus 2, the left controller 3, and the right controller 4. It should be noted that the details of the internal configuration of the main body apparatus 2 are shown in FIG. 6 and therefore are omitted in FIG. 7. The left controller 3 and the right controller 4 basically share a common configuration, and in the description that follows, the left controller 3 is described.

The left controller 3 includes a communication control section 101, which communicates with the main body apparatus 2. As shown in FIG. 7, the communication control section 101 is connected to components including the terminal 42. In this non-limiting example, the communication control section 101 can communicate with the main body apparatus 2 through both wired communication via the terminal 42 and wireless communication without via the terminal 42. The communication control section 101 controls the method for communication performed by the left controller 3 with the main body apparatus 2. That is, when the left controller 3 is attached to the main body apparatus 2, the communication control section 101 communicates with the main body apparatus 2 via the terminal 42. Further, when the left controller 3 is detached from the main body apparatus 2, the communication control section 101 wirelessly communicates with the main body apparatus 2 (specifically, the controller communication section 83). The wireless communication between the communication control section 101 and the controller communication section 83 is performed in accordance with the Bluetooth (registered trademark) standard, for example.

Further, the left controller 3 includes a memory 102 such as a flash memory. The communication control section 101 includes, for example, a microcomputer (or a microprocessor) and executes firmware stored in the memory 102, thereby performing various processes.

The left controller 3 includes buttons 103 (specifically, the buttons 33 to 39, 43, 44, and 47). Further, the left controller 3 includes the analog stick ("stick" in FIG. 7) 32. Each of the buttons 103 and the analog stick 32 outputs information regarding an operation performed on itself to the communication control section 101 repeatedly at appropriate timing.

The left controller 3 includes inertial sensors. Specifically, the left controller 3 includes an acceleration sensor 104. Further, the left controller 3 includes an angular velocity sensor 105. In this non-limiting example, the acceleration sensor 104 detects the magnitudes of accelerations along predetermined three axial (e.g., xyz axes shown in FIG. 4) directions. It should be noted that the acceleration sensor 104 may detect an acceleration along one axial direction or accelerations along two axial directions. In this non-limiting example, an angular velocity sensor 105 detects angular velocities about predetermined three axes (e.g., the xyz axes shown in FIG. 4). It should be noted that the angular velocity sensor 105 may detect an angular velocity about one axis or angular velocities about two axes. Each of the acceleration sensor 104 and the angular velocity sensor 105 is connected to the communication control section 101. Then, the detection results of the acceleration sensor 104 and the angular velocity sensor 105 are output to the communication control section 101 repeatedly at appropriate timing.

The communication control section 101 acquires information regarding an input (specifically, information regarding an operation or the detection result of the sensor) from each of input sections (specifically, the buttons 103, the analog stick 32, and the sensors 104 and 105). The communication control section 101 transmits operation data including the acquired information (or information obtained by performing predetermined processing on the acquired information) to the main body apparatus 2. It should be noted that the operation data is transmitted repeatedly, once every predetermined time. It should be noted that the interval at which the information regarding an input is transmitted from each of the input sections to the main body apparatus 2 may or may not be the same.

The above operation data is transmitted to the main body apparatus 2, whereby the main body apparatus 2 can obtain inputs provided to the left controller 3. That is, the main body apparatus 2 can determine operations on the buttons 103 and the analog stick 32 based on the operation data. Further, the main body apparatus 2 can calculate information regarding the motion and/or the orientation of the left controller 3 based on the operation data (specifically, the detection results of the acceleration sensor 104 and the angular velocity sensor 105).

First Non-Limiting Example

Next, a game in a first non-limiting example will be described. During the start of the game of this non-limiting example, a virtual space is defined. In the virtual space, a virtual camera and a player character PC are disposed. The virtual camera is set behind the player character PC. A game image including the player character PC is generated using the virtual camera, and is displayed on the display 12 or a stationary monitor.

Figure 8:
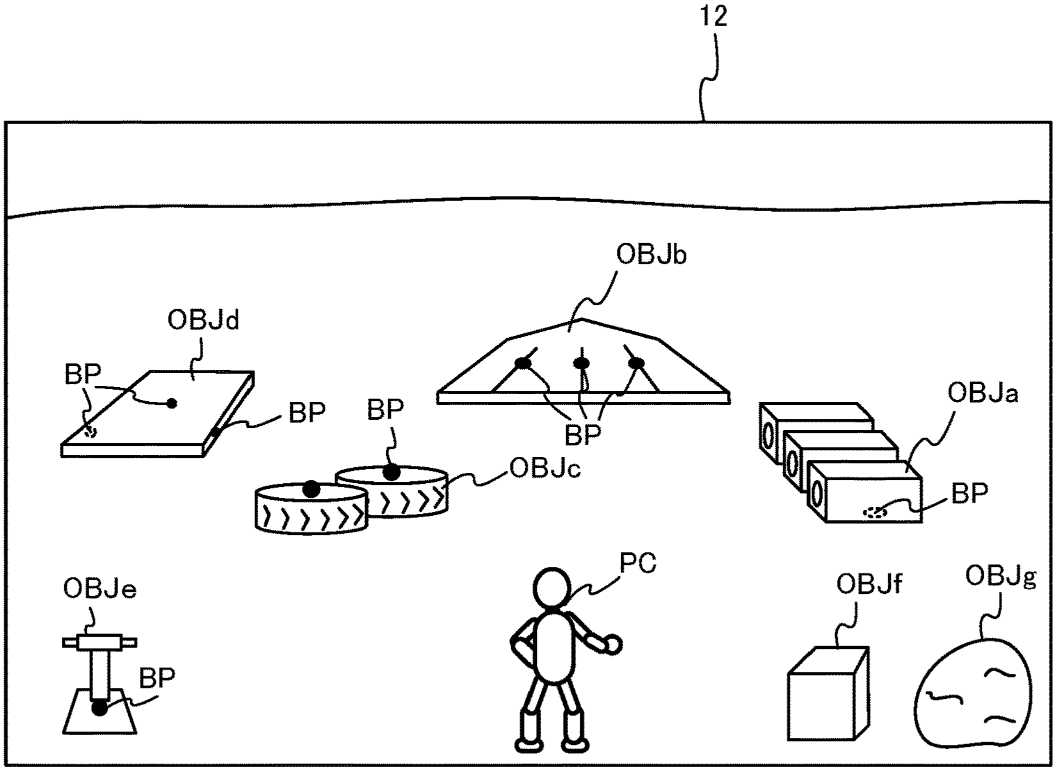
FIG. 8 is a diagram showing a non-limiting example of how a game is played using a player character PC appearing in a virtual space.

FIG. 8 is a diagram showing a non-limiting example of a game image that is displayed on the display 12 when the game of this non-limiting example is performed. As shown in FIG. 8, the game image includes the player character PC, and a plurality of material objects OBJ (OBJa-OBJg) as a virtual object disposed in the virtual space. The player character PC is operated by the user. The player character PC moves in the virtual space, and produces an assembled object (product) by putting a plurality of material objects OBJ together, according to the user's operation performed on the main body apparatus 2, the left controller 3, and/or the right controller 4.

The plurality of material objects OBJ are an object that can be moved in the virtual space according to the user's operation, and can be configured to be a part that is included in an assembled object. For example, the plurality of material objects OBJ are previously disposed on a ground in the virtual space. Alternatively, the plurality of material objects OBJ may be caused to appear in the virtual space according to the user's operation. For example, when the player character PC knocks down an enemy character or solves a predetermined problem, a material object OBJ may appear in the virtual space.

The user can put a plurality of material objects OBJ together to produce an assembled object. For example, the user can produce, as an assembled object, a vehicle object, such as a car, tank, aircraft, or boat, a weapon object for attacking an enemy character, or the like, and can play a game using the produced assembled object. For example, the player character PC can sit on the produced vehicle object, and can move in the virtual space by driving the vehicle object, or can attack an enemy character using the weapon object. It should be noted that the user can arbitrarily set the positions and/or orientations of a plurality of material objects OBJ and put the material objects OBJ together. Therefore, by putting a plurality of material objects OBJ together, the user can produce an assembled object that has no function, or a virtual object that is merely an object or ornament.

In the non-limiting example of FIG. 8, as a non-limiting example of a plurality of material objects OBJ disposed in the virtual space, an engine object OBJa, a wing object OBJb, a wheel object OBJc, a board object OBJd, a control stick object OBJe, a box object OBJf, and a rock object OBJg are shown.

The engine object OBJa is a material object that functions as a power to move a vehicle object. The engine object OBJa, when incorporated as a part into an assembled object, applies an acceleration, velocity, angular velocity, angular acceleration, or the like to the whole assembled object. The wing object OBJb is a material object that has a function of allowing a vehicle object to move in the air in the virtual space.

The wheel object OBJc is a material object that functions as a power to move a vehicle object. For example, the wheel object OBJc can be configured as a vehicle wheel. The board object OBJd is a material object that is a building material in the shape of a flat plate. The board object OBJd can, for example, be used as the body of a vehicle object. For the board object OBJd, a wall can be formed in the virtual space by arranging a plurality of the board objects OBJd in an upright position, and a three-dimensional object can be produced by putting a plurality of the board objects OBJd together.

The control stick object OBJe is a material object that has a function of controlling a movement direction of a vehicle object, and applies a force in a direction in which a vehicle object turns.

The box object OBJf is a material object that is a building material having a three-dimensional shape such as a cube or rectangular parallelepiped. The box object OBJf can be configured as a building material (e.g., a portion of a car body) for various assembled objects. The rock object OBJg is a material object that is a mass-shaped (e.g., circular or angulated), board-shaped, or bar-shaped building material which imitates a rock.

It should be noted that other material objects may be further prepared as a part of an assembled object.

As shown in FIG. 8, for a material object OBJ, one or more bonding points BP may be set. A bonding point BP is a position where material objects OBJ are bonded (connected) with each other with higher priority. A bonding point(s) BP is previously set for each material object OBJ by a game creator. For example, a bonding point BP is set at the bottom surface of the engine object OBJa. Three bonding points BP are set at the upper surface of the wing object OBJb. One or more bonding points BP are set for the wheel object OBJc, the board object OBJd, and the control stick object OBJe. It should be noted that no bonding point BP is set for the box object OBJf or the rock object OBJg.

The user selects any one material object OBJ from the material objects OBJ (stored objects) stored by the player character PC and the material objects OBJ disposed in the virtual space, and bonds the selected material object OBJ with another material object OBJ to put the plurality of material objects OBJ together. As a result, the user can produce an assembled object obtained by putting the plurality of material objects OBJ together, as a product.

Figure 9:
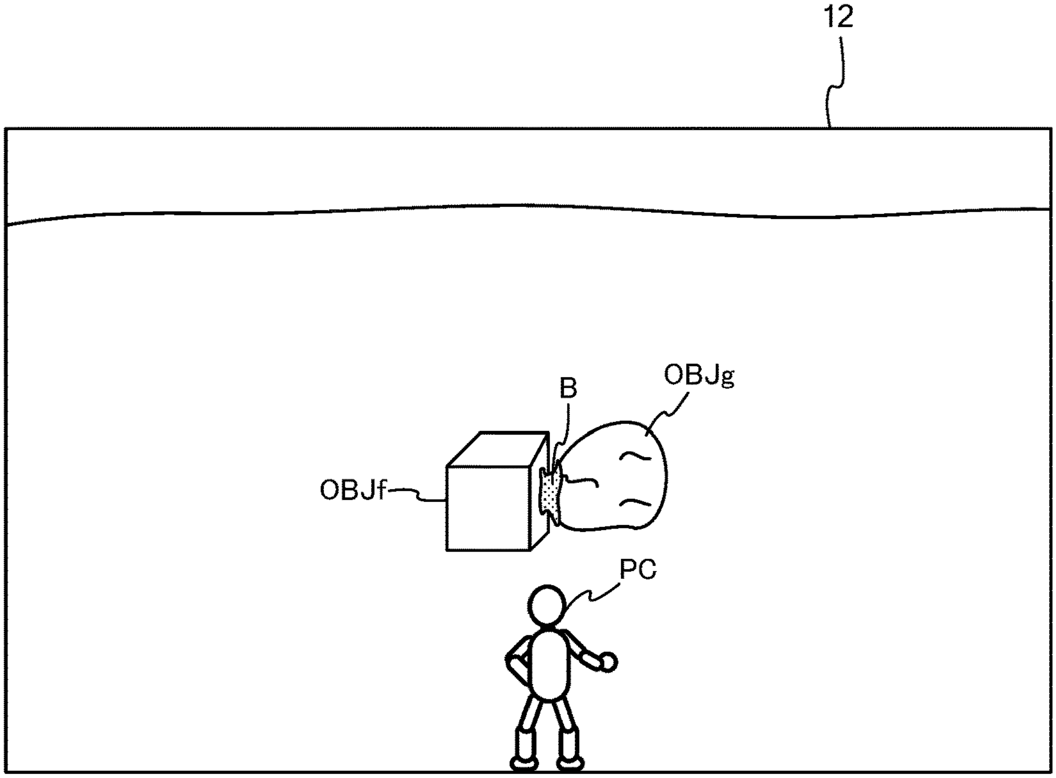
FIG. 9 is a diagram showing a non-limiting example of an assembled object produced by putting a rock object OBJg and a box object OBJf together.
Figure 10:
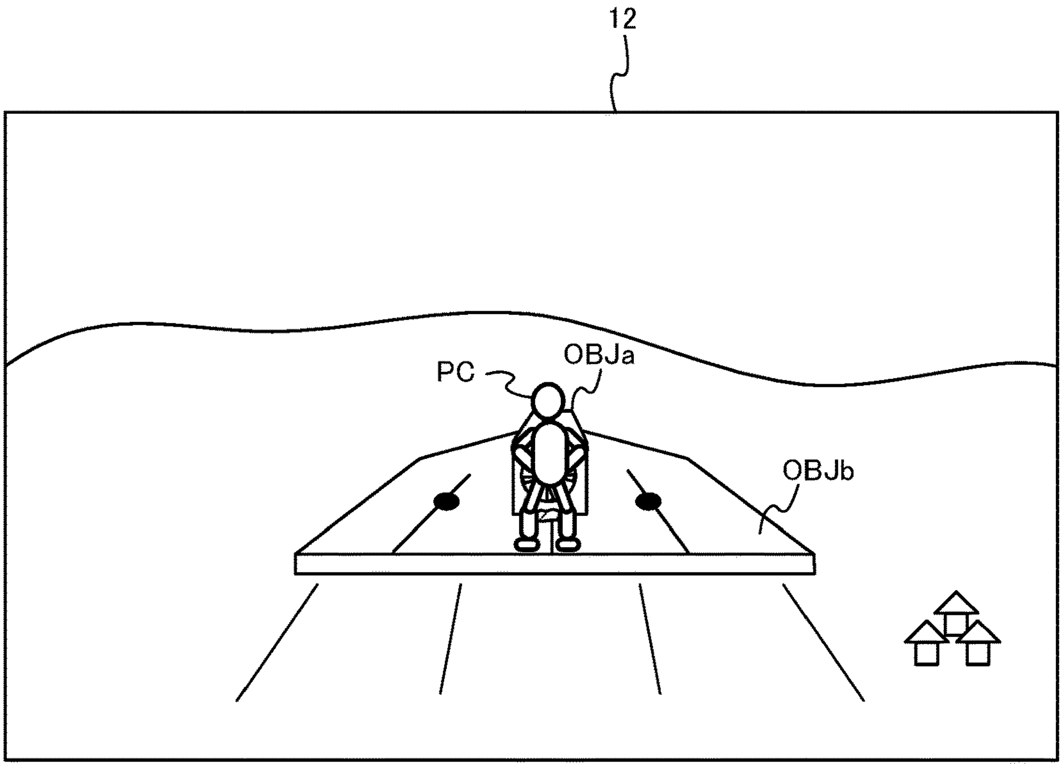
FIG. 10 is a diagram showing a non-limiting example of an assembled object produced by putting an engine object OBJa and a wing object OBJb together.

A non-limiting example in which material objects OBJ are put together to produce an assembled object will be described with reference to FIGS. 9 and 10. FIG. 9 is a diagram showing a non-limiting example of an assembled object produced by putting the rock object OBJg and the box object OBJf together. FIG. 10 is a diagram showing a non-limiting example of an assembled object produced by putting the engine object OBJa and the wing object OBJb together.

As shown in FIG. 9, an assembled object is produced by putting the rock object OBJg and the box object OBJf, which are disposed in the virtual space, together. Specifically, the player character PC moves and brings the rock object OBJg into contact with the box object OBJf according to the user's operation. Thereafter, the player character PC performs a motion of bonding the rock object OBJg and the box object OBJf together at any position using a bonding object B according to the user's operation, to produce an assembled object in which the rock object OBJg and the box object OBJf are put together.

As shown in FIG. 10, an assembled object (vehicle object) is produced by putting the engine object OBJa and the wing object OBJb together. Specifically, the player character PC moves and mounts the engine object OBJa at or near the center of the upper surface of the wing object OBJb according to the user's operation. Thereafter, the player character PC performs a motion of bonding the engine object OBJa and the wing object OBJb together with bonding points BP thereof in contact with each other using a bonding object B according to the user's operation, to produce an assembled object in which the engine object OBJa and the wing object OBJb are put together. FIG. 10 shows a situation in which the player character PC sits on a vehicle object obtained by putting the engine object OBJa and the wing object OBJb together, and drives the vehicle object to move in the air.

Figure 11:
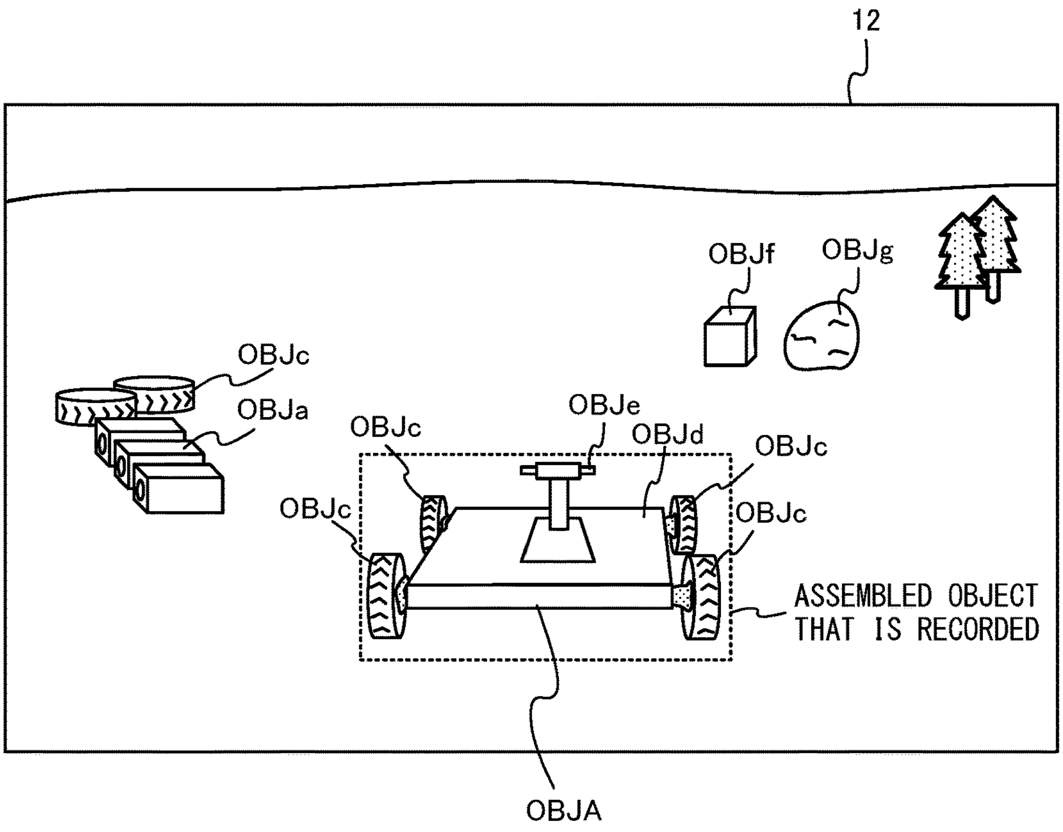
FIG. 11 is a diagram showing a non-limiting example of a game image displayed when an assembled object that is caused to appear in a virtual space is recorded.

A process of recording an assembled object that is caused to appear in the virtual space will be described with reference to FIG. 11. It should be noted that FIG. 11 is a diagram showing a non-limiting example of a game image displayed when an assembled object that is caused to appear in the virtual space is recorded. Although in the description that follows, a game is used as a non-limiting example of an application executed in the game system 1, other applications may be executed in the game system 1.

In FIG. 11, the display 12 of the game system 1 displays a game image that is a subjective image of the virtual space as viewed from the player character PC. The subjective image is a game image that is used to record, as a blueprint, an assembled object produced by the player character PC, and that can be displayed in a record mode set according to the user's operation.

In the non-limiting example of FIG. 11, the virtual space in which an assembled object OBJA and a plurality of material objects OBJa, OBJc, OBJf, and OBJg are disposed is displayed as the above subjective image. For example, the assembled object OBJA is produced by the player character PC in the virtual space as described above, by putting together stored objects temporarily stored by the player character PC and material objects disposed in the virtual space. Specifically, the assembled object OBJA is produced as a vehicle object including four wheel objects OBJc, one board object OBJd, and one control stick object OBJe.

In the game mode in which an assembled object is recorded, in the case where an assembled object is displayed in a game image, design information of the assembled object displayed in the game image is recorded according to the user's operation of recording the assembled object. As used herein, the design information refers to structure data of an assembled object for producing the assembled object again in the virtual space. For example, the design information contains the types of material objects constituting an assembled object, the positions where the material objects are bonded together, and the orientations of the material objects, and the like.

In the game mode in which an assembled object is recorded, when the user's operation of recording an assembled object is performed, a game scene is exhibited in which a game image displayed at the time of the user's operation is captured (e.g., a game scene in which a sound effect such as shutter sound is output, and a still game image at said time point is displayed). Thereafter, a game scene is exhibited which indicates that an assembled object included in the game image is recorded as a blueprint, and the user is thereby notified of the record assembled object. Here, the blueprint is created based on the captured image, and shows an external appearance of the assembled object based on the design information, for example. As an example, in addition to the image showing the blueprint in which the assembled object is displayed, information indicating that the blueprint is recorded is presented to the user using text, sound, or the like, whereby the user is notified that the assembled object is recorded as a blueprint. It should be noted that even in the case where an assembled object is not fully shown in a game image in the image capture scene, the blueprint of the assembled object may be recorded. In the case where a plurality of assembled objects are included in a game image in the image capture scene, the assembled object that is closest to the viewpoint (the position of the virtual camera) from which the game image has been captured, the assembled object whose image occupies the largest surface area in the game image, or the assembled object that includes the greatest number of material objects, may be recorded.

Although in the foregoing, a game image displayed at the time of the user's operation is captured as an image capture range, for example. Alternatively, instead of the entire displayed game image, a portion of the game image may be captured as an image capture range. As an example, a rectangular range at or near the center of a displayed image of the virtual space, which is a portion of the displayed image, may be set as an image capture range. In that case, instead of the entire displayed image of the virtual space, an image of the virtual space displayed in the rectangular range is an image capture range, and the game image in the image capture range is handled as a game image in an image capture scene.

In the above example, when the user's operation of recording an assembled object is performed, a game scene is exhibited in which a game image displayed at the time of the user's operation is captured, and an assembled object to be recorded is selected from the captured game image. An assembled object to be recorded may be selected and recorded in other ways. For example, a cursor for selecting an assembled object to be recorded as a blueprint may be displayed and superimposed on a game image, and an assembled object on which the cursor is displayed and superimposed at the time of the user's operation of recording an assembled object may be recorded as a blueprint. In that case, the above game scene for capturing a game image may not be exhibited, and a game image at the time of the user's operation may be handled as the above captured game image, whereby the process of recording an assembled object selected by the user as a blueprint can be executed as in the above recording process. Specifically, a game image that is a subjective image from the player character PC and in which an assembled object to be recorded that has been selected using the cursor is disposed such that the barycenter of the viewed surface of the assembled object is located at the center of the angle of view, may be created and recorded as a blueprint. In the embodiment in which an assembled object is selected and recorded using a cursor, the recording process may be performed by other recording procedures or schemes.

Figure 12:
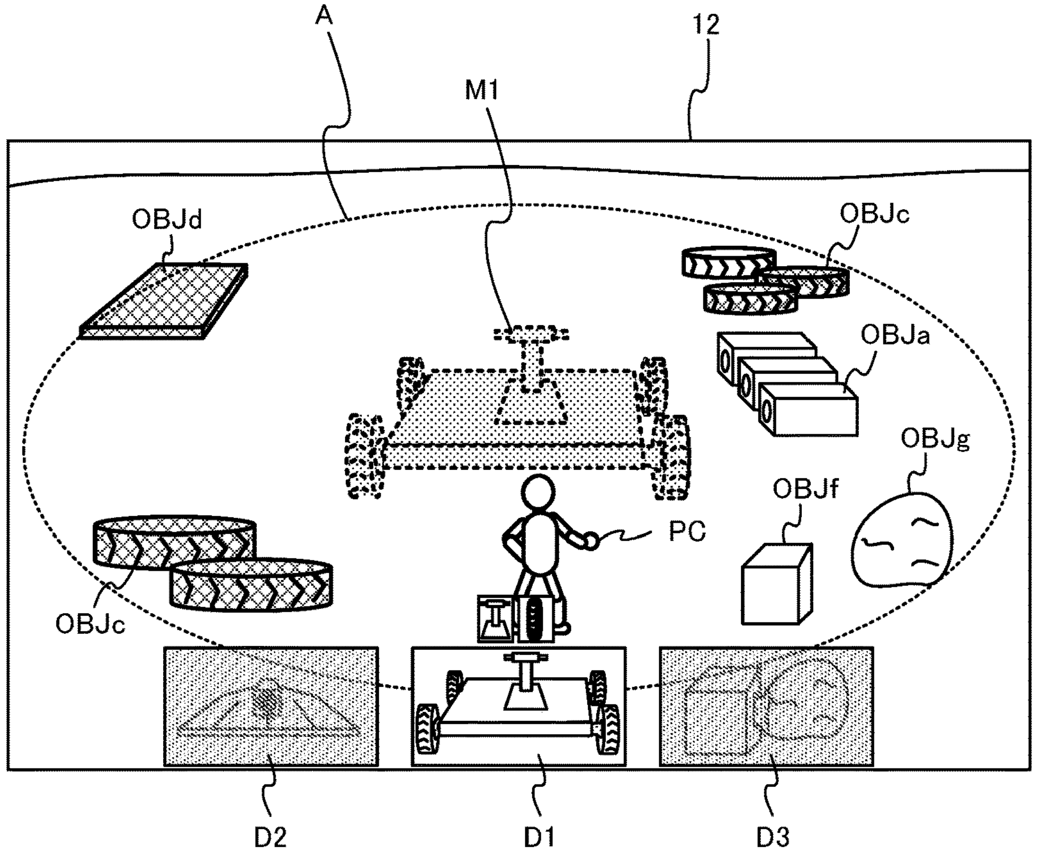
FIG. 12 is a diagram showing a non-limiting example of a game image in a game mode in which an assembled object is caused to appear in a virtual space.
Figure 13:
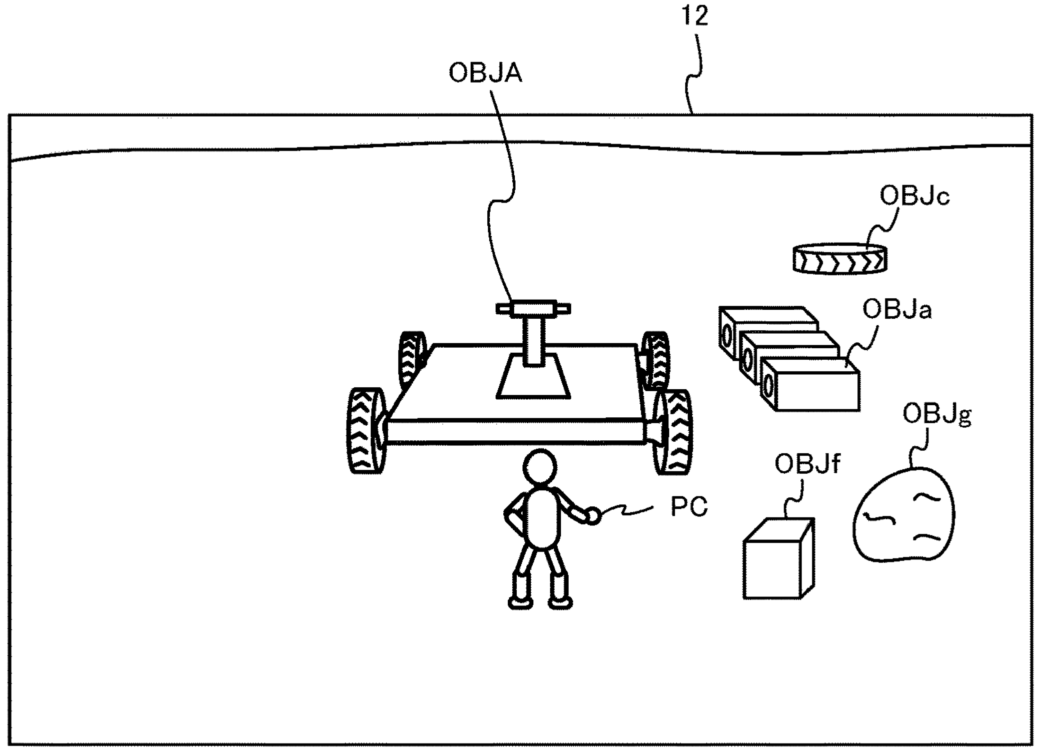
FIG. 13 is a diagram showing a non-limiting example of a game image in which an assembled object based on a recorded blueprint has been caused to appear in a virtual space.

A process of causing an assembled object based on a recorded blueprint to appear in the virtual space will be described with reference to FIGS. 12 and 13. It should be noted that FIG. 12 is a diagram showing a non-limiting example of a game image in the game mode in which an assembled object is caused to appear in the virtual space. FIG. 13 is a diagram showing a non-limiting example of the game image in which an assembled object based on a recorded blueprint has been caused to appear in the virtual space.

In FIG. 12, a game image showing the virtual space including the player character PC is displayed on the display 12 of the game system 1. For example, the game image shows the virtual space as viewed from a virtual camera disposed behind the player character PC. The game image of FIG. 12 is displayed in an appearance mode in which an assembled object is caused to appear, where transition to the appearance mode is performed according to the user's operation.

The game image shows blueprints selectable by the user and a blueprint currently selected as one to be caused to appear by the user. For example, in the non-limiting example of FIG. 12, a blueprint D1 is displayed as one to be caused to appear, and blueprints D2 and D3 are displayed as other blueprints that are selectable. As an example, the blueprints D2 and D3 are grayed out and thereby displayed in a form different from that of the blueprint D1, and are therefore distinguished from the blueprint D1, which is one that is currently to be caused to appear. For example, the blueprints D1-D3 are each prepared from an image of the virtual space captured by the user in the recording process. Alternatively, the blueprints D1-D3 are each prepared from an image of an assembled object to be recorded which is extracted from the captured image.

For example, a plurality of blueprints selectable by the user are presented, each of which is generated based on an image of the virtual space captured by the user. As an assembled object (product) to be caused to appear is thus selected/set through image capture, the captured image (blueprint) itself can be set as an item to be selected, and therefore, amusingness emerges, and the user themselves can easily know what product is to appear, based on the captured image (blueprint). It should be noted that blueprints selectable by the user may include blueprints previously prepared by a designer or the like. For example, the blueprints may be an item that can be acquired by the player character PC in the virtual space, or an item that is given to the player character PC when the player character PC clears a predetermined game event.

Here, as described above, the player character PC can temporarily store virtual objects or items. The virtual objects that the player character PC can temporarily store include a portion of the types of material objects that can constitute assembled objects. In the description that follows, material objects that the player character PC temporarily stores are referred to as "stored objects" and distinguished from other material objects. For example, a stored object may be one that is temporarily stored as a result of being picked up by the player character PC in the virtual space, or one that is newly stored into the player character PC when a predetermined event occurs. The blueprint D1, which is one that is currently to be caused to appear, is accompanied by and displayed together with the stored objects currently stored by the player character PC that can be incorporated into the assembled object that is produced based on the blueprint D1. In the non-limiting example of FIG. 12, it is illustrated that the player character PC currently stores the wheel object OBJc and the control stick object OBJe, which can be incorporated into the assembled object indicated by the blueprint D1. It should be noted that the blueprint D1, which is one that is currently to be caused to appear, may also be accompanied by and displayed together with numerical value information such as the number of stored objects that can be incorporated into the assembled object, the maximum number of material objects usable for the assembled object, and the minimum number of material objects currently required for the assembled object (i.e., the number obtained by subtracting the number of available material objects in a coverage area A described below in the virtual space from the maximum number).

It should be noted that the temporary storage of stored objects by the player character PC refers to carrying the stored objects without being attached to or held by the player character PC, for example. In this case, stored objects are not displayed in a game field. Stored objects can be brought out by the player character PC basically in an appropriate situation, and can be disposed in the game field, and used (e.g., attached or held). In this non-limiting example, the player character PC stores stored objects in a container (e.g., a pouch or item box) attached to the body thereof. It should be noted that such a container may not be displayed. Such a container may not exist, and only the function of storing stored objects may exist.

When the user's operation for transition to the appearance mode is performed, a coverage area A is displayed. The coverage area A is a range indicating which of the material objects disposed in the virtual space may be used for production of an assembled object that is currently to be caused to appear. It should be noted that a material object only a portion of which is included in the coverage area A may or may not be usable. For example, the coverage area A is set as a circular or elliptical range having a predetermined size around a position on the ground in front of the player character PC. The player character PC can automatically produce an assembled object to be caused to appear, using material objects disposed in the coverage area A of the material objects disposed in the virtual space, and cause the assembled object to appear in the virtual space.

In this non-limiting example, only if an assembled object to be caused to appear can be completely assembled from stored objects of the player character PC and material objects disposed in the coverage area A, i.e., only if there are enough prepared material objects to constitute an assembled object to be caused to appear, the assembled object can be caused to appear. In the non-limiting example of FIG. 12, an assembled object that are assembled from four wheel objects OBJc, one board object OBJd, and one control stick object OBJe is to be caused to appear. Meanwhile, four wheel objects OBJc and one board object OBJd are disposed in the coverage area A, and the player character PC stores a control stick object OBJe as a stored object, and the assembled object can be completely assembled by putting these material objects together. Therefore, when the user's operation of causing the assembled object to appear is performed, the assembled object appears.

It should be noted that as another non-limiting example, even if an assembled object to be caused to appear cannot be completely assembled from stored objects of the player character PC and material objects disposed in the coverage area A, i.e., there are not enough material objects to constitute an assembled object to be caused to appear, a portion of the assembled object may be able to be caused to appear. For example, material objects excluding missing material objects may be caused to appear as a portion of an assembled object with the material objects put together in the same manner as when all the material objects of the assembled object are put together. In that case, if a material object that is required for linking other material objects is missing, small groups that can be assembled only from material objects excluding the missing material object, or single material objects, are caused to appear separately. As a non-limiting example, for an assembled object that is completely assembled by putting a material object A, a material object B, a material object C, a material object D, and a material object E together in the stated order, if the material object C is missing, an assembled product obtained by putting the material object A and the material object B together and an assembled product obtained by putting the material object D and the material object E together are caused to appear. As another non-limiting example, for an assembled object that is completely assembled by putting a material object A, a material object B, and a material object C together in the state order, if the material object B is missing, the single material object A and the single material object C are moved to places where the material objects A and C are expected to appear, and are caused to appear separately.

In addition, in the game image, an expected completed model object is displayed for an assembled object currently designated as one to be caused to appear. For example, in the non-limiting example of FIG. 12, an expected completed model object M1 is displayed at a center of the coverage area A, i.e., on the ground in front of the player character PC. The expected completed model object M1 shows an expected shape of an assembled object that appears if the assembly thereof is completed based on the currently selected blueprint D1, in a display form (e.g., a framework object displayed in a translucent form) different from that of an actual assembled object. It should be noted that an expected completed model object disposed in the virtual space or an assembled object appearing in the virtual space based on the expected completed model object is disposed at a center of the coverage area A as described above, or alternatively, may be disposed at any position that allows at least a portion thereof to be present in the coverage area A.

In a first non-limiting example, the expected completed model object M1 is displayed, floating above the ground in the virtual space. In that case, an assembled object that is caused to appear based on the position and orientation of the expected completed model object M1 appears, floating above the ground, and then, falls down to the ground, and is disposed on the ground. In a second non-limiting example, in the case where another object is disposed on the ground of the virtual space in which the expected completed model object M1 is disposed, the expected completed model object M1 may be displayed above the second object with a predetermined space interposed therebetween. In either case, the expected completed model object M1 is displayed without a lower portion of the expected completed model object M1 overlapping with or being in contact with a portion of the ground or a portion of the second object. In a third non-limiting example, in the case where the coverage area A has no space in which the expected completed model object M1 can be disposed, e.g., there is another object (e.g., a wall provided at a center of the coverage area A or a roof provided at an upper portion of the coverage area A) that would penetrate into the expected completed model object M1 if the expected completed model object M1 were disposed in the virtual space, the expected completed model object M1 may not be displayed or may be grayed out so that the user is notified that the assembled object cannot be caused to appear.

The displayed position and displayed orientation of the expected completed model object M1 may be changeable according to the user's operation. As an example, once the expected completed model object M1 has been disposed and displayed in the virtual space, only the orientation of the expected completed model object M1 may be changeable according to the user's operation. As another example, the position of the expected completed model object M1 disposed and displayed in the virtual space may be changeable in the forward, backward, leftward, and rightward directions in the coverage area A according to the user's operation, or the height (position in the upward and downward directions) thereof from the ground may be changeable in the coverage area A according to the user's operation.

If every one of the material objects required for assembling the expected completed model object M1 as an assembled object is present in the coverage area A and/or is among the stored objects, the display form of these material objects is changed (e.g., colored). Meanwhile, at least one of the material objects required for assembling the expected completed model object M1 as an assembled object is not present in the coverage area A or is not among the stored objects, these material objects remain in a default display form (e.g., colorless and translucent). Therefore, all the material objects required for assembling the expected completed model object M1 as an assembled object are displayed in a different form, depending on whether or not every one of these material objects is present in the coverage area A and/or is among the stored objects. Therefore, this allows the user to recognize whether or not there are enough material objects to complete an assembled object to be caused to appear. The expected completed model object M1 also allows the user to predict where an assembled object will appear in the virtual space.

It should be noted that even in the case where a material object required for completing an assembled object may have a different appearance from that of a material object incorporated as a part in said assembled object, if the shapes of these material objects are substantially the same, these material objects may be handled as identical objects. For example, if the shapes of material objects are categorized in the same type (e.g., logs, rocks, weapons, and control sticks) and the shape similarity therebetween falls within a predetermined value, the material objects may be considered to be identical objects in the process of assembling an assembled object. As an example, material objects whose surfaces have different appearances (e.g., different textures or colors) and that have the same shape (substantially the same shape) may be handled as identical objects. It should be noted that objects that are considered to have the same shape may be previously set, or alternatively, the similarity therebetween may be calculated, as appropriate, to determine whether or not the objects are identical to each other. In addition, the type of a material (e.g., wood or metal) for an object may be taken into account, and objects made of the same material may be handled as identical objects.

Of the material objects disposed in the virtual space, an object(s) that is to be used in the assembled object (an object that is used when the assembled object appears) is displayed in a different display form. For example, of the material objects in the coverage area A, a material object(s) that is to be used to complete an assembled object that is currently to be caused to appear is displayed in a different display form (e.g., colored). In the non-limiting example of FIG. 12, of the material objects in the coverage area A, four wheel objects OBJc and one board object OBJd that are to be used in an assembled object to be caused to appear are displayed in a different display form (in the non-limiting example of FIG. 12, those objects are indicated by hatching). This allows the user to recognize which of the material objects disposed in the virtual space is to be consumed in production of an assembled object.

It should be noted that if there are more material objects that can used to complete an assembled object to be caused to appear than necessary, a predetermined priority level may be set for each material object, and material objects may be consumed according to priority. As an example, if there are more material objects disposed in the coverage area A than necessary, a material object located closer to the player character PC may be consumed with higher priority. As another example, substantially the same object is present as a material object in the coverage area A and is among the stored objects, the material object disposed in the coverage area A may be consumed with higher priority.

Here, the material objects disposed in the virtual space include one that can be temporarily stored as a stored object by the player character PC, and one that cannot be temporarily stored as a stored object by the player character PC. A non-storable object that cannot be temporarily stored as a stored object by the player character PC may be a material object much bigger than the player character PC in the virtual space, or a material object for which there are a number of material objects having slightly different shapes and sizes (e.g., rocks, trees, etc.), or the like. In this non-limiting example, examples of a non-storable object that cannot be temporarily stored as a stored object by the player character PC include a board object OBJd, a box object OBJf, a rock object OBJg, and a jewelry box object (not shown). It should be noted that examples of a material object that can be temporarily stored as a stored object by the player character PC include an engine object OBJa, a wheel object OBJc, and a control stick object OBJe.

It should be noted that at least a portion of an assembled object may be used as a material object in the virtual space that can be used in an assembled object to be caused to appear. For example, in the case where an assembled object already assembled is currently present in the coverage area A, a portion of the material objects constituting the assembled object may be used in order to cause a newly assembled object to appear. Specifically, at least a portion of an assembled object including a material object(s) that can be used in an assembled object to be caused to appear is disposed in the virtual space in the coverage area A, a material object(s) included in the assembled object disposed in the virtual space may be used in an assembled object to be caused to appear. When a material object that is a portion of an assembled object disposed in the virtual space is used, said material object is disconnected from the other objects in said assembled object and is lost, so that the other material objects fall down from the current position to the ground due to the disconnection and loss. It should be noted that any connection between the other material objects in the assembled object may be maintained.

In the foregoing, it is determined which of the material objects disposed in the coverage area A is used, without taking into consideration whether or not a material object is a portion of an assembled object. Specifically, as in the case where material objects are present as a separate object, a material object located closer to the player character PC may be used with higher priority, for example. Note that in any case, the material objects disposed in the coverage area A are used with higher priority than at least that of stored objects. It should be noted that in another non-limiting example, material objects that are present as a separate object may be used with higher priority than that of material objects that are present as a portion of an assembled object. In still another non-limiting example, material objects that are present as a separate object may be used with the highest priority, stored objects may be used with the next highest priority, and material objects that are a portion of an assembled object may be used with the lowest priority.

The coverage area A may be set as a three-dimensional range in the virtual space. For example, the coverage area A may be defined as a circular or elliptical cylinder having a predetermined size. In that case, material objects disposed in the circular or elliptical cylinder that covers a predetermined height range above the player character PC may be selected as an object to be used in the coverage area A, or material objects disposed in the height range above the ground may be selected as an object to be used. It should be noted that the coverage area A set as a three-dimensional range may have a three-dimensional shape having a limit in the height direction, or not having a limit in the height direction (i.e., an infinite height).

In FIG. 13, when the user's operation of causing an assembled object to appear is performed, the assembled object appears at a position and with an orientation at and with which the expected completed model object has been disposed. For example, in the non-limiting example of FIG. 13, the assembled object OBJA appears at the position in the virtual space where the expected completed model object M1 has been disposed, and with the orientation with which the expected completed model object M1 has been disposed. At this time, the material objects in the virtual space that were used to produce the appearing assembled object are removed from the virtual space in response to the appearance. It should be noted that when material objects are removed from the virtual space, a game scene in which the player character PC collects the material objects may be displayed. The stored objects that were used to produce the appearing assembled object are also removed from the stored objects of the player character PC. Here, it is assumed that the user's operation of causing an assembled object to appear is enabled only if every one of the material objects required for completing the assembled object is present in the coverage area A and/or is among the stored objects. In this case, only a completely assembled object can be caused to appear, and a not-completely assembled object cannot be caused to appear. It should be noted that the user's operation of causing an assembled object to appear may be enabled even if there are not enough material objects to complete the assembled object in the coverage area A and the stored objects. In that case, a not-completely assembled object can be caused to appear.

It should be noted that the above material object removed from the virtual space may be used as at least a portion of an assembled object to be caused to appear. Here, in the case where a material object is used as at least a portion of an assembled object to be caused to appear, a material object in the coverage area A may be moved to an appropriate position in the assembled object to be put together with the assembled object, or alternatively, a material object may be temporarily removed from the coverage area A, and an assembled object having substantially the same material object may be caused to appear. In other words, the use of a material object as at least a portion of an assembled object to be caused to appear means not only that the material object is directly used, but also that the material object is temporarily removed from the virtual space, and substantially the same material object is used. As a non-limiting example, the process of using a material object may be implemented by either (a) or (b) described below.

(a) Removing material objects from the virtual space, putting polygon models different form the polygon models of the material objects together to produce an assembled object, and causing the assembled object to appear (b) Causing an assembled object including at least a portion of the polygon models of material objects (specifically, an assembled object obtained by putting together polygon models including the polygon models of some material objects and the polygon models of other objects) to appear in a game field Even in the case of the process (b), a scene can be displayed in which material objects are removed, and an assembled object is produced by putting said material objects and other objects together.

Thus, in the case where virtual objects disposed in the virtual space are used as a material for an assembled object, the maintenance of game aspects requires the user to have the right to possess or control the virtual objects. In this non-limiting example, the user is allowed to specify the coverage area A covering positions where virtual objects are disposed, or move virtual objects into the coverage area A, whereby the user has the right to possess or control the virtual objects, and therefore, an assembled object including the virtual objects as a material can be produced with game aspects maintained. In the game field, terrains having various properties/shapes such as mountains, valleys, rivers, and seas are typically set, and therefore, an appearing assembled object may fail to be appropriately disposed in the virtual space. However, in this non-limiting example, the virtual space region in which an assembled object appears is one in which material objects can be appropriately disposed, and therefore, an appearing assembled object is also highly likely to be appropriately disposed, and the possibility that an assembled object falls to be lost during appearance can be reduced, resulting in high usability.

Figure 14:
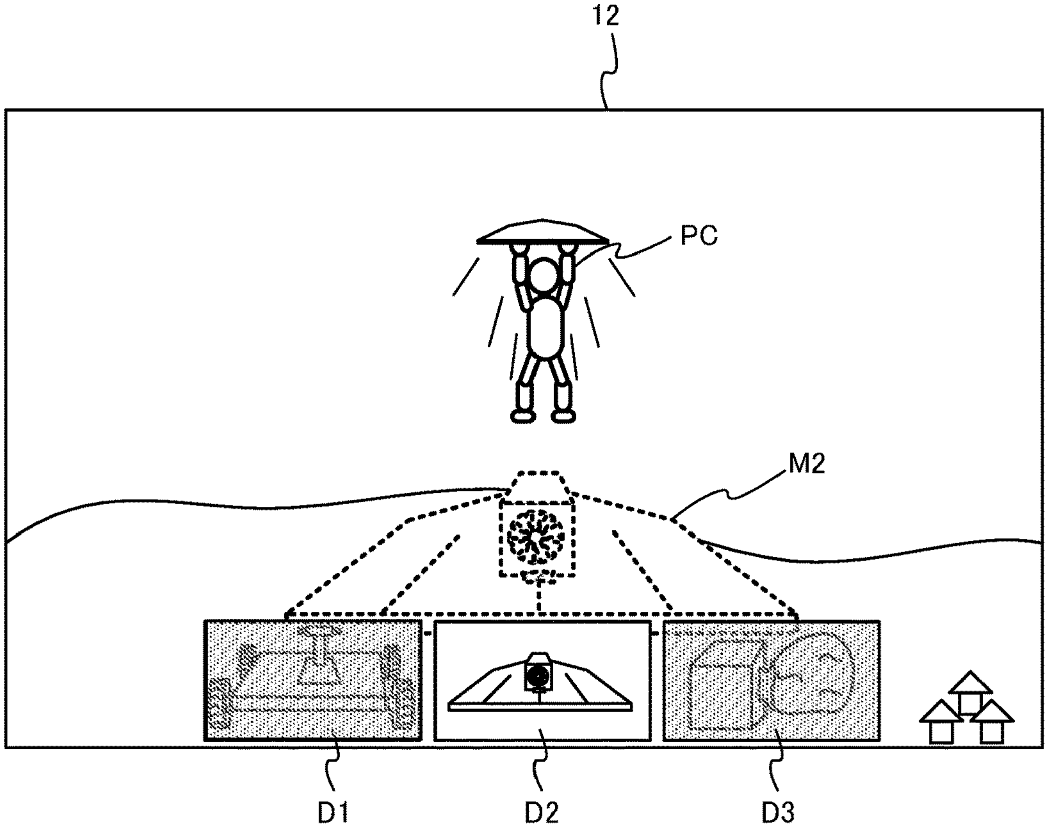
FIG. 14 is a diagram showing a non-limiting example of how a player character PC causes an assembled object to appear in the air in a virtual space.

It should be noted that in the situation where the player character PC is disposed in the air in the virtual space, if an assembled object based on a blueprint is caused to appear, the assembled object may be caused to appear in a form different from on the ground. FIG. 14 is a diagram showing a non-limiting example of how the player character PC causes an assembled object to appear in the air in the virtual space.

In FIG. 14, when the player character PC causes an assembled object to appear in the air in the virtual space, an expected completed model object for the assembled object that is currently to be caused to appear is displayed in the air in the virtual space below the player character PC. For example, in the non-limiting example of FIG. 14, an expected completed model object M2 is displayed in the air in the virtual space below the player character PC. The expected completed model object M2 shows an expected shape that is to be taken by an assembled object based on a currently selected blueprint D2 when the assembled object appears after being completed, in a display form (e.g., a translucent framework object) different from the actual assembled object, as in the case where an assembled object appears on the ground.

Thereafter, when the user's operation of causing the player character PC to cause the assembled object to appear in the air in the virtual space is performed, the assembled object appears at the position and with the orientation at and with which the expected completed model object M2 has been disposed. For example, in the non-limiting example of FIG. 14, an assembled object based the blueprint D2 appears at the position in the virtual space where the expected completed model object M2 has been disposed, and with the orientation with which the expected completed model object M2 has been disposed. Thereafter, the player character PC performs a motion of jumping down from the position in the air, and can proceed with a game while sitting on the assembled object that has appeared.

In the non-limiting example of FIG. 14, in the case where the player character PC causes an assembled object to appear in the air in the virtual space, the coverage area A is not displayed. However, in the case where an assembled object is caused to appear in the air, the coverage area A may or may not be set. In the former case, if a three-dimensional (e.g., circular- or elliptical-cylindrical) coverage area may be set in the virtual space around the player character PC, and the three-dimensional coverage area reaches the ground, material objects disposed on the ground in the coverage area and material objects disposed in the air in the three-dimensional coverage area may be usable. In that case, the coverage area is set below the player character PC located in the air. In the latter case, in the case where all material objects for an assembled object to be caused to appear are stored in the player character PC, the user's operation of causing the assembled object to appear may be enabled. It should be noted that the coverage area set when the player character PC causes an assembled object to appear in the air in the virtual space may be set in front of the player character PC located in the air.

In addition, when the player character PC is disposed in the air in the virtual space, no assembled object may be allowed to appear. In that case, when the user performs an operation of causing an assembled object to appear with the player character PC disposed in the air in the virtual space, the user may be notified that no assembled object is allowed to appear, by a displayed image or sound.

Second Non-Limiting Example

Next, a game according to a second non-limiting example will be described. In the game of the second non-limiting example, an assembled object (product) is produced by the player character PC putting a plurality of material objects OBJ together according to the user's operation. Thereafter, the assembled object produced by the player character PC is automatically recorded as a blueprint of the assembled object. Here, a blueprint in the second non-limiting example is created based on an assembled object produced according to the user's operation, and indicates an appearance of the assembled object based on the above design information. As in the first non-limiting example, in the second non-limiting example, a process of causing an assembled object based on a recorded blueprint to appear in the virtual space can also be carried out.

As a non-limiting example, a blueprint in the second non-limiting example is automatically recorded each time the player character PC puts material objects OBJ together. For example, when a material object A and a material object B are put together, a blueprint of an assembled product of the material object A and the material object B is automatically recorded. Thereafter, when a material object C is put together with the assembled product of the material object A and the material object B, a blueprint of an assembled product of the material object A, the material object B, and the material object C is automatically recorded separately from the blueprint of the assembled product of the material object A and the material object B. Therefore, in this case, the two blueprints, i.e., the blueprint of the assembled product of the material object A and the material object B, and the blueprint of the assembled product of the material object A, the material object B, and the material object C, are recorded.

Here, in the game of the second non-limiting example, in addition to the above blueprint (hereinafter referred to as a first type blueprint) automatically recorded, a blueprint of an assembled object relating to a predetermined item that is obtained in the game (hereinafter referred to as a second type blueprint) may be recorded. An upper limit may also be set on the possible number of recorded first type blueprints and the possible number of recorded second type blueprints. In that case, each time the player character PC puts material objects together, then if the upper limit for first type blueprints is exceeded by automatically recording a first type blueprint, one of the first type blueprint already recorded that was recorded at a relatively early time (a relatively early recorded one) is automatically deleted. When the player character PC obtains the predetermined item, and a second type blueprint relating to the item is recorded, then if the upper limit for second type blueprints is exceeded, one of the second type blueprints already recorded that was selected according to the user's operation or was recorded at a relatively early time is deleted.

Such automatic deletion may not be performed. To that end, a specific blueprint (hereinafter referred to as a third type blueprint) may be set from the first type and second type blueprints. As a non-limiting example, a "preferred" blueprint may be selected and set from the first and second type blueprints according to the user's operation, and may thereby be recorded as the third type blueprint. Due to the above recording process, the record of the third type blueprint is maintained even when the number of recorded first type blueprints exceeds the upper limit for first type blueprints or when the number of recorded second type blueprints exceeds the upper limit for second type blueprints. It should be noted that an upper limit may be set on the possible number of recorded third type blueprints. When the user records a new third type blueprint, then if the upper limit for third type blueprints is exceeded, one of the third type blueprints already recorded is selected and deleted according to the user's operation.

It should be noted that when the third type blueprint is selected and recorded from the first and second type blueprints, the selected blueprint may be changed to a third type blueprint (i.e., the blueprint is moved and recorded from the list of recorded first type blueprints or the list of recorded second type blueprints to the list of recorded third type blueprints), or the selected blueprint may be copied as a third type blueprint (i.e., the blueprint is copied and recorded from the list of recorded first type blueprints or the list of recorded second type blueprints to the list of recorded third type blueprints). In the latter case, the blueprint of an assembled object recorded as a third type blueprint may be deleted as the first or second type blueprint by the above deletion process, but continues to be recorded as a third type blueprint.

The first type blueprint may not be automatically recorded as described above when the player character PC separates a material object from an assembled object. For example, when a material object C is selected and separated from an assembled object of a material object A, a material object B, the material object C, a material object D, and a material object E (A-B-C-D-E) to separate the assembled object into the material object A and the material object B (A-B), the material object C (C), and the material object D and the material object E (D-E), an assembled object of the material object A and the material object B (A-B) and an assembled object of the material object D and the material object E (D-E) are obtained. However, if such separated assembled products are automatically recorded as a first type blueprint each time such separation occurs, the upper limit of the possible number of recorded first type blueprints is relatively quickly reached, and blueprints that the user does not desire to record may be recorded. If such separated assembled objects are not automatically recorded as a first type blueprint, the above situation can be avoided.

As another non-limiting example, the user's operation indicating completion of an assembled object may trigger recording of the blueprint of the assembled object as a first type blueprint. In that case, when the blueprint of an assembled object is newly recorded as a first type blueprint, the user is notified of an image showing the recorded blueprint indicating the assembled object, and of information indicating recording of the blueprint, by means of text, sound, or the like.

No upper limit may be set on the possible number of recorded second type blueprints. In that case, for example, second type blueprints can be recorded without a limit when a predetermined number of predetermined items prepared in the game are obtained, and may not be deleted according to the user's operation or automatically. As a result, in the case where the blueprint of an assembled object that is a rare second type blueprint can be obtained, a situation that the user accidentally deletes that blueprint can be avoided.

In a non-limiting embodiment, the game of the first non-limiting example and the game of the second non-limiting example may be combined together as appropriate. In a first non-limiting preferred example, the second type blueprint of the second non-limiting example may be recorded in the game of the first non-limiting example. In a second non-limiting preferred example, a specific blueprint selected from blueprints recorded by performing an operation of capturing a game image in the first non-limiting example may also be recorded as a third type blueprint of the second non-limiting example. In a third non-limiting preferred example, a game may be played in which both a blueprint recorded by performing an operation of capturing a game image in the first non-limiting example and a first type blueprint automatically recorded in the second non-limiting example can be recorded.

Figure 15:
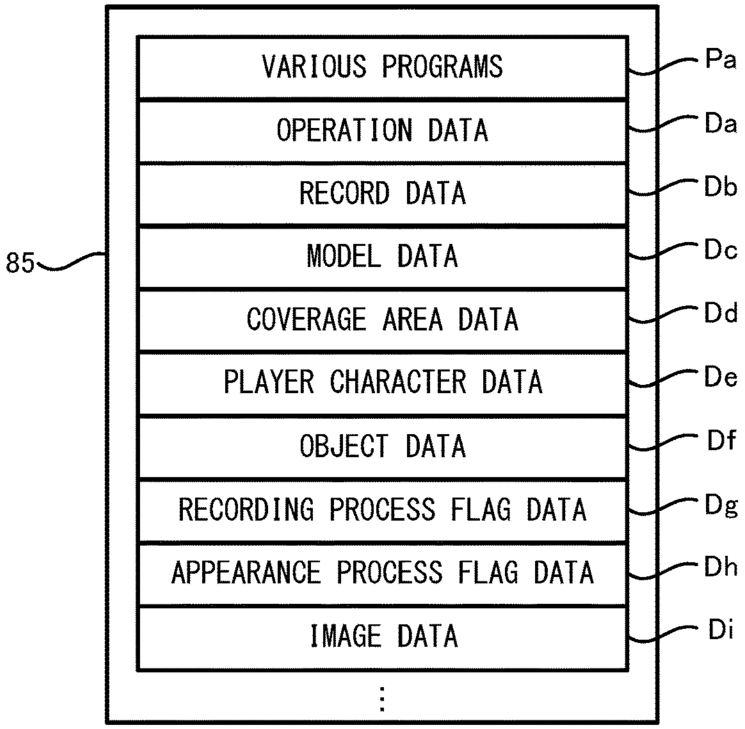
FIG. 15 is a diagram showing a non-limiting example of a data area contained in a DRAM 85 of the main body apparatus 2 in a first non-limiting example.

Next, a non-limiting example of a specific process executed in the game system 1 of the first non-limiting example will be described with reference to FIGS. 15-18. FIG. 15 is a diagram showing a non-limiting example of a data area contained in the DRAM 85 of the main body apparatus 2 in the first non-limiting example. Note that in addition to the data of FIG. 15, the DRAM 85 also stores data that is used in other processes, which will not be described in detail.

Various programs Pa that are executed in the game system 1 are stored in a program storage area of the DRAM 85. In this non-limiting example, the programs Pa include an application program (e.g., a game program) for performing information processing based on data obtained from the left controller 3 and/or the right controller 4, and the main body apparatus 2. Note that the programs Pa may be previously stored in the flash memory 84, may be obtained from a storage medium removably attached to the game system 1 (e.g., a predetermined type of storage medium attached to the slot 23) and then stored in the DRAM 85, or may be obtained from another apparatus via a network, such as the Internet, and then stored in the DRAM 85. The processor 81 executes the programs Pa stored in the DRAM 85.

Various kinds of data that are used in processes such as an information process that are executed in the game system 1 are stored in a data storage area of the DRAM 85. In this non-limiting example, the DRAM 85 stores operation data Da, record data db, model data Dc, coverage area data Dd, player character data De, object data Df, recording process flag data Dg, appearance process flag data Dh, image data Di, and the like.

The operation data Da is obtained, as appropriate, from each of the left controller 3 and/or the right controller 4 and the main body apparatus 2. As described above, the operation data obtained from each of the left controller 3 and/or the right controller 4 and the main body apparatus 2 includes information about an input from each input section (specifically, each button, an analog stick, a touch panel, or each sensor) (specifically, information about an operation, and the result of detection by each sensor). In this non-limiting example, operation data is obtained from each of the left controller 3 and/or the right controller 4 and the main body apparatus 2 through wireless communication. The obtained operation data is used to update the operation data Da as appropriate. Note that the operation data Da may be updated for each frame that is the cycle of a process executed in the game system 1, or may be updated each time operation data is obtained.

The record data db indicates design information about each recorded assembled object. For example, for each recorded assembled object, the record data db includes data indicating design information in which the types of material objects constituting the recorded assembled object, positions at which the material objects are bonded together, the orientation of each material object, and the like.

The model data Dc indicates the type, position, orientation, display form, and the like of an expected completed model object disposed in the virtual space.

The coverage area data Dd indicates the position, size, shape, and the like of a coverage area disposed in the virtual space.

The player character data De indicates the position and orientation of the player character PC disposed in the virtual space, the movement and state of the player character PC in the virtual space, and the like. The player character data De also includes data indicating the types, number, and the like of stored objects temporarily stored by the player character PC. The object data Df indicates the type, position, orientation, state, bonding to other objects, display form, and the like of each object disposed in the virtual space.

The recording process flag data Dg indicates a recording process flag that is set "on" for the game mode in which an assembled object is recorded. The appearance process flag data Dh indicates an appearance process flag that is set "on" for the game mode in which an assembled object is caused to appear.

The image data Di is for displaying an image (e.g., an image of a character or object, an image of the virtual space, and a background image) on a display screen (e.g., the display 12 of the main body apparatus 2).

Figure 16:
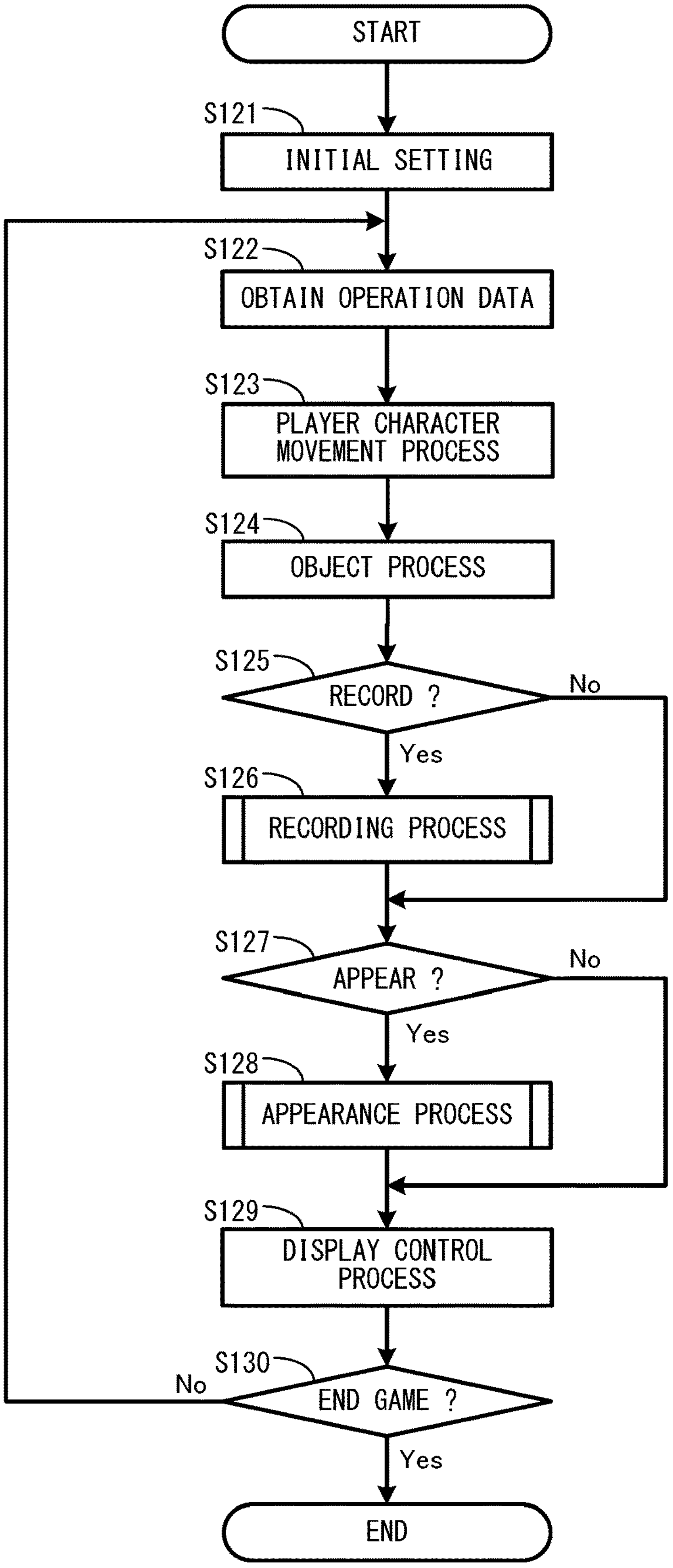
FIG. 16 is a flowchart showing a non-limiting example of an information process that is executed by a game system 1.
Figure 17:
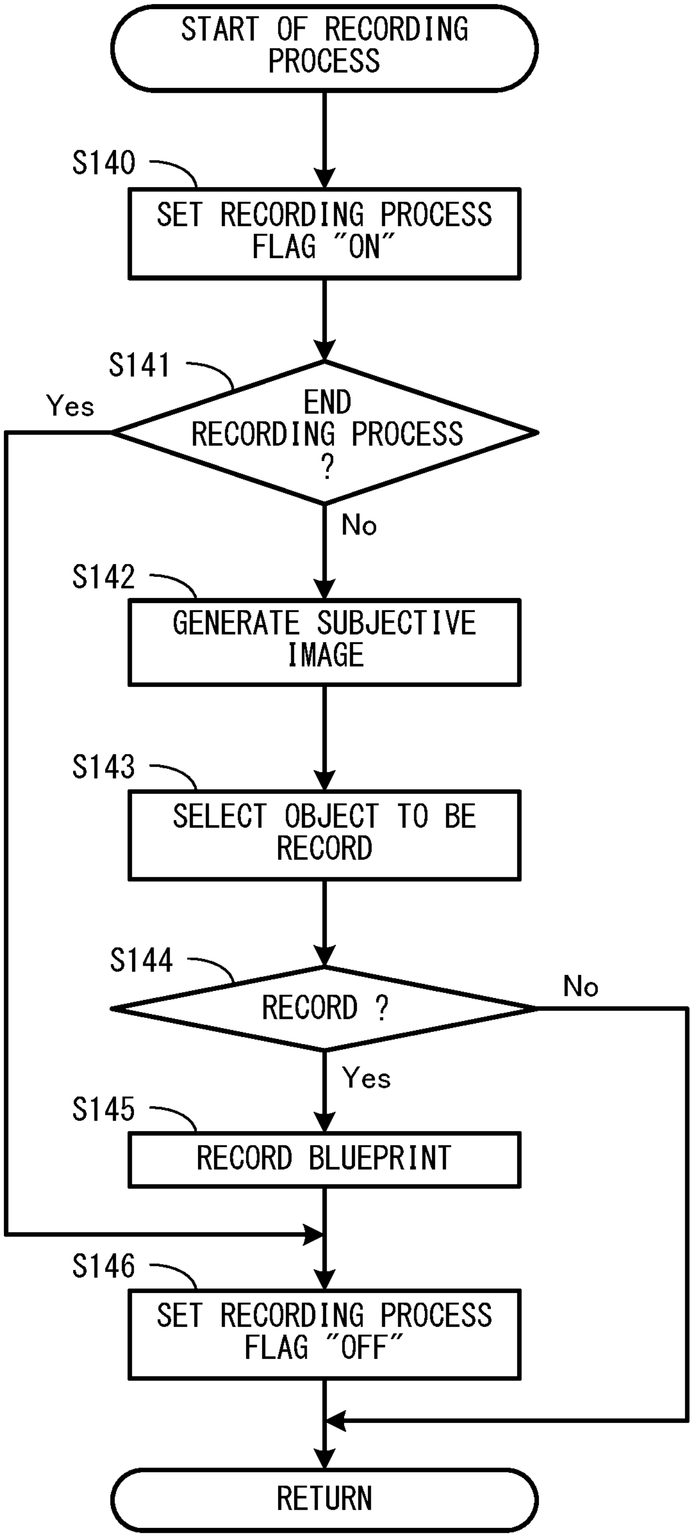
FIG. 17 is a subroutine showing a specific non-limiting example of a recording process performed in step S126 shown in FIG. 16.
Figure 18:
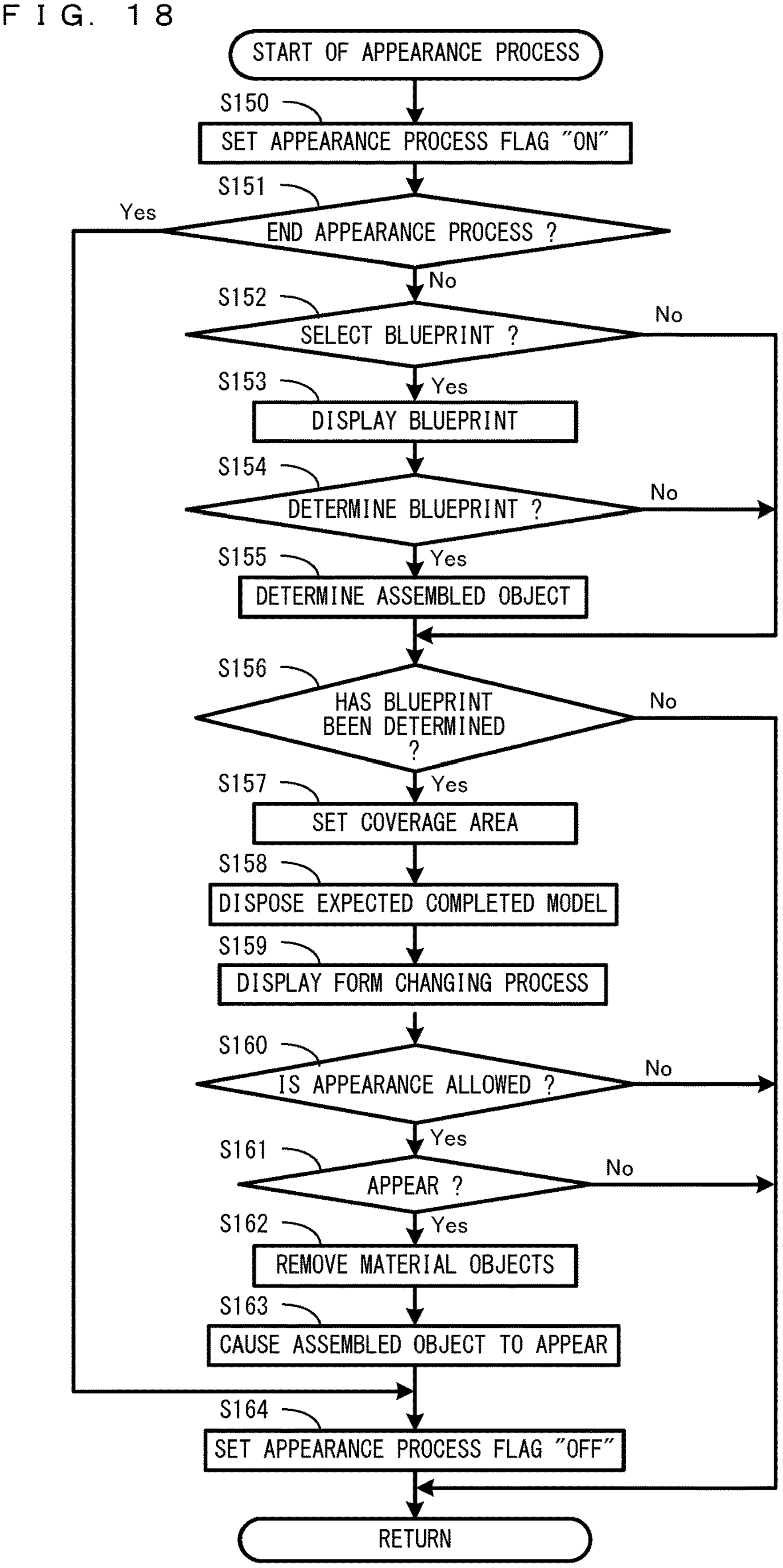
FIG. 18 is a subroutine showing a specific non-limiting example of an appearance process performed in step S128 shown in FIG. 16.

Next, a specific non-limiting example of an information process in the first non-limiting example will be described with reference to FIGS. 16-18. FIG. 16 is a flowchart showing a non-limiting example of an information process that is executed by the game system 1. FIG. 17 is a subroutine showing a specific non-limiting example of a recording process that is performed in step S126 shown in FIG. 16. FIG. 18 is a subroutine showing a specific non-limiting example of an appearance process that is performed in step S128 shown in FIG. 16. In this non-limiting example, a series of processes shown in FIGS. 16-18 is performed by the processor 81 executing a predetermined application program (game program) included in the programs Pa. The information processes of FIGS. 16-18 are started with any suitable timing.

Note that the steps in the flowchart of FIGS. 16-18, which are merely illustrative, may be executed in a different order, or another step may be executed in addition to (or instead of) each step, if a similar effect is obtained. In this non-limiting example, it is assumed that the processor 81 executes each step of the flowchart. Alternatively, a portion of the steps of the flowchart may be executed by a processor or dedicated circuit other than the processor 81. In addition, a portion of the steps executed by the main body apparatus 2 may be executed by another information processing apparatus that can communicate with the main body apparatus 2 (e.g., a server that can communicate with the main body apparatus 2 via a network). Specifically, the steps of FIGS. 16-18 may be executed by a plurality of information processing apparatuses including the main body apparatus 2 cooperating with each other.

In FIG. 16, the processor 81 performs initial setting for the information process (step S121), and proceeds to the next step. For example, in the initial setting, the processor 81 initializes parameters for performing processes described below. For example, the processor 81 initially disposes the player character PC and a plurality of objects in the virtual space based on predetermined settings for the virtual space, and initially sets the player character data De and the object data Df.

Next, the processor 81 obtains operation data from each of the left controller 3, the right controller 4, and/or the main body apparatus 2, and updates the operation data Da (step S122), and proceeds to the next step.

Next, the processor 81 moves the player character PC in the virtual space (step S123), and proceeds to the next step. For example, the processor 81 moves the player character PC based on the operation data Da obtained in step S122, and updates the player character data De.

Next, the processor 81 moves each object in the virtual space (step S124), and proceeds to the next step. For example, the processor 81 moves each object disposed in the virtual space based on the movement of the player character PC (e.g., the player character PC's motion of moving a vehicle object), the movements of the object itself and other objects, and virtual physical calculation in the virtual space, and updates the object data Df. In addition, the processor 81, when newly disposing an object in the virtual space in response to a game event, adds data related to the object to update the object data Df. In addition, the processor 81, when causing the player character PC to temporarily store an object disposed in the virtual space or a newly obtained object, updates the player character data De using said object as a stored object. Furthermore, when objects are connected together or objects connected together are separated from each other, depending on the player character PC, the processor 81 updates the object data Df, depending on the state of the connection.

Next, the processor 81 determines whether or not to perform the recording process (step125). For example, if the operation data obtained in step S122 indicates the user's instruction to transition to the game mode in which the recording process is performed or if the recording process flag indicated by the recording process flag data Dg is "on," the result of the determination in step S125 by the processor 81 is positive. If the processor 81 determines to perform the recording process, the processor 81 proceeds to step S126. Meanwhile, if the processor 81 does not determine to perform the recording process, the processor 81 proceeds to step S127.

In step S126, the processor 81 performs the recording process, and proceeds to step S127. The recording process performed in step S126 will now be described with reference to FIG. 17.

In FIG. 17, the processor 81 sets the recording process flag "on" (step S140), and proceeds to the next step. For example, the processor 81 sets the recording process flag "on," and updates the recording process flag data Dg.

Next, the processor 81 determines whether or not to end the game mode in which the recording process is performed (step S141). The condition for ending the game mode in which the recording process is performed, in step S141, is, for example, that the condition for ending the game mode is satisfied, that the user performs an operation of ending (canceling) the game mode, that the user performs an operation of determining not to record an assembled object to be recorded, as a blueprint, etc. If the processor 81 does not determine to end the game mode in which the recording process is performed, the processor 81 proceeds to step S142. If the processor 81 determines to end the game mode in which the recording process is performed, the processor 81 proceeds to step S146.

Next, the processor 81 generates a subjective image of the virtual space as viewed from the player character PC (step S142), and proceeds to the next step. For example, the processor 81 disposes a virtual camera whose position and orientation are set such that the focal point of the virtual camera is located in front of the player character PC relative to the gaze point of the player character PC, and generates a subjective image for the player character PC.

Next, the processor 81 selects an assembled object to be recorded, using the subjective image generated in step S142 (step S143), and proceeds to the next step. For example, the processor 81 selects an assembled object to be recorded as a blueprint from objects in the virtual space included in the subjective image according to a predetermined selection rule. As an example, if there are a plurality of assembled objects included in the subjective image, the processor 81 selects an assembled object closest to the gaze point in the subjective image as an object to be recorded.

Next, the processor 81 determines whether or not to record the assembled object that is currently to be record as a blueprint (step S144). For example, if the operation data obtained in step S122 indicates an instruction to record the assembled object, the result of the determination in step S144 by the processor 81 is positive. If the processor 81 determines to record the assembled object that is currently to be record as a blueprint, the processor 81 proceeds to step S145. Meanwhile, if the processor 81 does not determine to record the assembled object that is currently to be record as a blueprint, the processor 81 ends the subroutine.

Next, the processor 81 records design information about the assembled object to be recorded (step S145), and proceeds to step S146. For example, the processor 81 adds, to the record data db, design information indicating the configuration of the assembled object to be recorded that has been selected in step S144.

In step S146, the processor 81 sets the recording process flag "off," and ends the subroutine. For example, the processor 81 sets the recording process flag "off," and updates the recording process flag data Dg.

Referring back to FIG. 16, in step S127, the processor 81 determines whether or not to perform the appearance process. For example, if the operation data obtained in step S122 indicates the user's instruction to transition to the game mode in which the appearance process is performed, or if the appearance process flag indicated by the appearance process flag data Dh is "on," the result of the determination in step S127 by the processor 81 is positive. If the processor 81 determines to perform the appearance process, the processor 81 proceeds to step S128. Meanwhile, if the processor 81 does not determine to perform the appearance process, the processor 81 proceeds to step S129.

In step S128, the processor 81 performs the appearance process, and proceeds to step S129. The appearance process performed in step S128 will now be described with reference to FIG. 18.

In FIG. 18, the processor 81 sets the appearance process flag "on" (step S150), and proceeds to the next step. For example, the processor 81 sets the appearance process flag "on," and updates the appearance process flag data Dh.

Next, the processor 81 determines whether or not to end the game mode in which the appearance process is performed (step S151). The condition for ending the game mode in which the appearance process is performed, in step S151, is, for example, that the condition for ending the game mode is satisfied, that the user performs an operation of ending (canceling) the game mode, etc. If the processor 81 does not determine to end the game mode in which the appearance process is performed, the processor 81 proceeds to step S152. If the processor 81 determines to end the game mode in which the appearance process is performed, the processor 81 proceeds to step S164.

Next, the processor 81 determines whether or not the current stage is one on which the user should be prompted to select a blueprint (step S152). As an example, if the current stage is one on which a blueprint has already been determined, the result of the determination in step S152 by the processor 81 is negative. If the current state is one on which the user should be prompted to select a blueprint, the processor 81 proceeds to step S153. Meanwhile, if the current state is not one on which the user should be prompted to select a blueprint, the processor 81 proceeds to step S156.

In step S153, the processor 81 sets a game image that shows blueprints selectable by the user and prompts the user to select one from the selectable blueprints, and proceeds to the next step. For example, the processor 81 extracts design information about all assembled objects recorded in the record data db, generates a game image showing a list of blueprints of assembled objects produced based on the design information, and prompts the user to select one from the blueprints. At this time, an expected completed model (expected completed model object) based on the blueprint temporarily selected by the user and a coverage area may be displayed in the virtual space, depending on the current position and orientation of the player character PC. In addition, images of stored objects of the player character PC that can be used in the assembled object indicated by the blueprint temporarily selected by the user may be displayed around said blueprint.

Next, the processor 81 determines whether or not the user's operation of determining a blueprint has been performed (step S154). For example, if the operation data obtained in step S122 indicates the user's instruction to determine a blueprint, the result of the determination in step S154 by the processor 81 is positive. If the user's operation of determining a blueprint has been performed, the processor 81 proceeds to step S155. Meanwhile, if the user's operation of determining a blueprint has not been performed, the processor 81 proceeds to step S156.

In step S155, the processor 81 determines an assembled object to be caused to appear, and proceeds to step S156. For example, the processor 81 determines the assembled object produced based on the currently selected blueprint as an assembled object to be caused to appear, and extracts design information about said assembled object from the record data db. Thereafter, the processor 81 sets data for displaying an expected completed model object based on the design information, and updates the model data Dc using said data.

In step S156, the processor 81 determines whether or not a blueprint has been determined. If a blueprint has been determined, the processor 81 proceeds to step S157. Meanwhile, if a blueprint has not been determined, the processor 81 ends the subroutine. It should be noted that even after a blueprint has once been determined, selection of a blueprint may be performed again. In that case, if the result of the determination in step S152 by the processor 81 is positive, selection of a blueprint can be performed again.

In step S157, the processor 81 sets a coverage area in the virtual space, and proceeds to the next step. For example, the processor 81 sets a coverage area around a position on the ground that is located at a predetermined distance in front of the player character PC (see FIG. 12), and updates the coverage area data Dd based on the coverage area.

Next, the processor 81 disposes the expected completed model object in the virtual space (step S158), and proceeds to the next step. For example, the processor 81 disposes the expected completed model object indicated by the model data Dc in the virtual space at the center of the coverage area set in step S157.

Next, the processor 81 performs the process of changing the display forms of material objects disposed in the virtual space and the expected completed model object (step S159), and proceeds to the next step. For example, the processor 81 changes the display form of the material objects disposed in the coverage area set in step S157 that will be actually used when an assembled object set as one to be caused to appear appears, from the default display form, and updates the object data Df using the changed display form. In addition, when the coverage area moves, then if a material object leaves the coverage area, the processor 81 returns the display form of the material object to the default display form, and updates the object data Df using the changed display form. In addition, the processor 81 extracts the stored objects of the player character PC that will be actually used when an assembled object set as one to be caused to appear appears, and provides settings for displaying an image indicating the extracted objects in a game image (e.g., around the selected blueprint). In addition, if a material object required for completing an assembled object corresponding to the expected completed model object currently set is present in the coverage area and/or is among the stored objects, the processor 81 changes the display form of the corresponding material object portion from the default display form, and updates the model data Dc using the changed display form. If a material object required for completing the assembled object leaves the coverage area and there are not enough material objects, the processor 81 returns the display form of the corresponding material object portion to the default display form, and updates the model data Dc using the changed display form. It should be noted that if there is another object that would penetrate into the expected completed model object, and therefore, there is not a space for disposing the expected completed model object in the coverage area, the processor 81 may not display or may gray out the expected completed model object.

Next, the processor 81 determines whether or not the assembled object that is currently to be caused to appear can be caused to appear (step S160). For example, if every one of the material objects required for completing the assembled object to be caused to appear is present in the coverage area and/or is among the stored objects, the processor 81 determines that the assembled object can be caused to appear. If the assembled object can be caused to appear, the processor 81 proceeds to step S161. Meanwhile, if the assembled object cannot be caused to appear, the processor 81 ends the subroutine. It should be noted that if there is another object that would penetrate into the expected completed model object, and therefore, there is not a space for disposing the expected completed model object in the coverage area, the processor 81 may determine that the assembled object cannot be caused to appear.

In step S161, the processor 81 determines whether or not to cause the assembled object to be caused to appear to appear in the virtual space. For example, if the operation data obtained in step S122 indicates the user's instruction to cause the assembled object to be caused to appear to appear in the virtual space, the result of the determination in step S161 by the processor 81 is positive. If the assembled object to be caused to appear is caused to appear in the virtual space, the processor 81 proceeds to step S162. Meanwhile, if the assembled object to be caused to appear is not caused to appear in the virtual space, the processor 81 ends the subroutine.

In step S162, the processor 81 removes the material objects used in the appearing assembled object from the virtual space, and proceeds to the next step. For example, the processor 81 deletes, from the object data Df, the data related to the material objects disposed in the virtual space that are used in the appearing assembled object. In addition, the processor 81 deletes, from the player character data De, the data related to the material objects selected from the stored objects that are used in the appearing assembled object.

Next, the processor 81 causes the assembled object to be caused to appear to appear (step S163), and proceeds to step S164. For example, the processor 81 causes the expected completed model object indicated by the model data Dc to transition to an assembled object whose display form has been changed to the normal display form (e.g., the translucent display form is changed to the same display form as that of the virtual object disposed in the virtual space), and adds data related to said assembled object to the object data Df so that said assembled object is present in the virtual space.

It should be noted that in steps S162 and S163, data related to material objects used in an assembled object are deleted from the object data Df, and data related to the assembled object is added to the object data Df. As described above, the process of deleting material objects may be carried out using any of the following processes.

(a) Temporarily deleting data of material objects that are incorporated into an assembled object from the object data Df, and adding data of a newly assembled object including said material objects to the object data Df (b) Changing at least a portion (position data, orientation data, bonding information, etc.) of the data of material objects that should be incorporated into an assembled object to those of the material objects that have been incorporated into the assembled object, and leaving the data of the material objects as data of the assembled object in the object data Df In the process (b), data of a material object in the object data Df can be stored as a portion of the data of an assembled object including the material object in the object data Df. As used herein, the meaning of the term "delete" with respect to data of a material object does not exclude the situation that after the data of the material object is deleted, the data of the material object is used as a portion of the data of another object (specifically, an assembled object).

In step S164, the processor 81 sets the appearance process flag "off," and ends the subroutine. For example, the processor 81 sets the appearance process flag "off," and updates the appearance process flag data Dh.

Referring back to FIG. 16, in step S129, the processor 81 performs a display control process, and proceeds to the next step. For example, the processor 81 disposes the player character PC, virtual objects including material objects, assembled objects, and the like, an expected completed model object, a coverage area, and the like, in the virtual space, based on the record data db, the model data Dc, the coverage area data Dd, the player character data De, the object data Df, the image data Di, and the like. The processor 81 also sets the position and/or orientation of a virtual camera for generating a display image based on the operation data Da, and the position and orientation, etc., of the player character PC, and disposes the virtual camera in the virtual space. Thereafter, the processor 81 generates an image of the virtual space as viewed from the set virtual camera, and displays the virtual space image on the display 12.

Next, the processor 81 determines whether or not to end the game process (step S130). The condition for ending the game process in step S130 is, for example, that the condition for ending the game process is satisfied, that the user performs an operation of ending the game process, etc. If the processor 81 does not determine to end the game process, the processor 81 returns to step S122 and repeats the process. If the processor 81 determines to end the game process, the processor 81 ends the process of the flowchart. Thereafter, the processor 81 repeatedly executes the series of steps S122-S130 until the processor 81 determines to end the process in step S130.

Thus, in the above non-limiting examples, the user sets a coverage area covering positions where material objects are disposed in the virtual space, or moves material objects into the coverage area, which allows the user to have the right to possess or control the material objects, and can thereby produce an assembled object using material objects with game aspects maintained. In addition, a virtual space region where an assembled object appears is one where material objects can be appropriately disposed, and therefore, it is highly likely that an appearing assembled object can be appropriately disposed, and the possibility that an assembled object falls to be lost during appearance can be reduced, resulting in excellent usability.

Although in the above non-limiting example, an assembled object that has once been produced by the user operating the player character PC is caused to appear in the virtual space again, a product that the user has never produced may be caused to appear as an assembled object. For example, an assembled object based on a blueprint previously prepared by a designer or the like may be caused to appear according to the user's operation, or an assembled object may be caused to appear based on a blueprint obtained by the user recording an assembled object previously prepared by a designer or the like. Alternatively, an assembled object may be caused to appear based on a blueprint of the assembled object that another user has once produced. It should be noted that the blueprint previously prepared by a designer or the like can be set as an item that can be acquired by the player character PC during a game.

The term "appear" in the above non-limiting examples may not necessarily mean that an assembled object stays at the position where the assembled object appears. Alternatively, after an assembled object appears, a process of positioning the assembled object from the position where the assembled object appears may be performed. For example, an assembled object may be caused to appear at the position in the virtual space where an expected completed model object has been displayed, and thereafter, the position where the assembled object is disposed in the virtual space may be adjusted according to the user's operation, and the assembled object may be disposed at the adjusted position so that the appearance of the assembled object is completed.

An assembled object that can be caused to appear may be produced using at least one material object belonging to one of stored objects temporarily stored by the player character PC, objects that can be stored by the player character PC and are disposed in the virtual space, and non-storable objects that cannot be stored by the player character PC and are disposed in the virtual space. Therefore, in the above non-limiting examples, a game in which at least one of the three types of objects does not exist can be implemented. As an example, even in a game in which the player character PC cannot temporarily store an object, the above non-limiting examples can be implemented by producing an assembled object by putting only non-storable objects disposed in the virtual space together. The stored objects may not be stored by the player character PC, and may be possessed by the user who operates the player character PC.

When an assembled object is caused to appear, a predetermined item (e.g., a special item that provides the right to cause an assembled object to appear) may be required in addition to the above material objects. As an example, when an assembled object is caused to appear, at least one of the item disposed in the coverage area A in the virtual space and/or the item possessed by the player character PC may be consumed. As another example, when an assembled object is caused to appear, an availability indicator set for the item disposed in the coverage area A in the virtual space and/or the item possessed by the player character PC may be reduced by a predetermined amount.

In the above non-limiting example, an assembled object is produced as a product by putting a plurality of material objects together by bonding the objects with each other. A plurality of material objects may be fixed together with or without another object interposed therebetween. The bonding in the above non-limiting examples includes both of the fixation embodiments, and includes an embodiment in which material objects are put and fixed together by suction, electrical attraction, joining, fusion, welding, pressure bonding, screwing, fitting, sticking, or the like. A plurality of material objects may be altered to have other external appearance without substantially maintaining the original external appearance, and may then form a product. For example, a plurality of material objects may be kneaded, combined, fused, or the like into a single object (product).

Although in the above non-limiting example, the region for using material objects from the virtual space and the region in which a position where an assembled object is caused to appear is displayed are indicated by the same coverage area A, or alternatively, may be different regions. As an example, the region for using material objects from the virtual space may be larger than the region in which a position where an assembled object is caused to appear is displayed, or these regions may have different shapes. The position where an assembled object is caused to appear may be freely set by the user irrespective of the region for using material objects.

In addition, stored objects that are temporarily stored by the player character PC may not be used for an assembled object that can be caused to appear. Specifically, an assembled object may be produced using only material objects belonging to either storable objects that can be stored by the player character PC and are disposed in the virtual space or non-storable objects that cannot be stored by the player character PC and are disposed in the virtual space. In order to produce an assembled object using stored object temporarily stored by the player character PC, it is necessary to temporarily dispose the stored objects in the coverage area A in the virtual space. Nevertheless, an assembled object is produced only from material objects that are present in the coverage area A, and therefore, it is easier to recognize what material objects are used for the assembled object.

When there are not enough material objects to constitute an assembled object to be caused to appear, special objects that can be substituted for missing material objects may be used. For example, when a log object and a stone object required for an assembled object are missing, two special objects that alter into a log object and a stone object, respectively (or objects having shapes similar to a log object and a stone object) may be used to cause an assembled object to appear.

The meaning of the orientation of an object in the above non-limiting examples may include a position and direction of the object.

The game system 1 may be any suitable apparatus, including a handheld game apparatus, or any suitable handheld electronic apparatus (a personal digital assistant (PDA), mobile telephone, personal computer, camera, tablet computer, etc.), etc. In that case, an input apparatus for performing an operation of moving an object may be, instead of the left controller 3 or the right controller 4, another controller, mouse, touchpad, touch panel, trackball, keyboard, directional pad, slidepad, etc.

In the foregoing, all process steps in the above information process are performed in the game system 1. Alternatively, at least a portion of the process steps may be performed in another apparatus. For example, when the game system 1 can also communicate with another apparatus (e.g., another server, another image display apparatus, another game apparatus, another mobile terminal, etc.), the process steps may be executed in cooperation with the second apparatus. By thus causing another apparatus to perform a portion of the process steps, a process similar to the above process can be performed. The above information process may be executed by a single processor or a plurality of cooperating processors included in an information processing system including at least one information processing apparatus. In the above non-limiting example, the information process can be performed by the processor 81 of the game system 1 executing a predetermined program. Alternatively, all or a portion of the above process may be performed by a dedicated circuit included in the game system 1.

Here, according to the above non-limiting variation, this non-limiting example can be implanted in a so-called cloud computing system form or distributed wide-area and local-area network system forms. For example, in a distributed local-area network system, the above process can be executed by cooperation between a stationary information processing apparatus (a stationary game apparatus) and a mobile information processing apparatus (handheld game apparatus). It should be noted that, in these system forms, each of the above steps may be performed by substantially any of the apparatuses, and this non-limiting example may be implemented by assigning the steps to the apparatuses in substantially any manner.

The order of steps, setting values, conditions for determination, etc., used in the above information process are merely illustrative, and of course, other order of steps, setting values, conditions for determination, etc., may be used to implement the above non-limiting examples.

The above program may be supplied to the game system 1 not only through an external storage medium, such as an external memory, but also through a wired or wireless communication line. The program may be previously stored in a non-volatile storage device in the game system 1. Examples of an information storage medium storing the program include non-volatile memories, and in addition, CD-ROMs, DVDs, optical disc-like storage media similar thereto, and flexible disks, hard disks, magneto-optical disks, and magnetic tapes. The information storage medium storing the program may be a volatile memory storing the program. Such a storage medium may be said as a storage medium that can be read by a computer, etc. (computer-readable storage medium, etc.). For example, the above various functions can be provided by causing a computer, etc., to read and execute programs from these storage media.

While several non-limiting example systems, methods, devices, and apparatuses have been described above in detail, the foregoing description is in all aspects illustrative and not restrictive. It should be understood that numerous other modifications and variations can be devised without departing from the spirit and scope of the appended claims. It is, therefore, intended that the scope of the present technology is limited only by the appended claims and equivalents thereof. It should be understood that those skilled in the art could carry out the literal and equivalent scope of the appended claims based on the description of this non-limiting example and common technical knowledge. It should be understood throughout the present specification that expression of a singular form includes the concept of its plurality unless otherwise mentioned. Specifically, articles or adjectives for a singular form (e.g., “a,” “an,” “the,” etc., in English) include the concept of their plurality unless otherwise mentioned. It should also be understood that the terms as used herein have definitions typically used in the art unless otherwise mentioned. Thus, unless otherwise defined, all scientific and technical terms have the same meanings as those generally used by those skilled in the art to which this non-limiting example pertain. If there is any inconsistency or conflict, the present specification (including the definitions) shall prevail.

As described above, this non-limiting example is applicable as a game program, game apparatus, game system, and game processing method, etc., that allow a product or the like to be produced using materials in a virtual space.

What is claimed is:

1. A non-transitory computer-readable storage medium having stored therein a game program executable by a computer included in an information processing apparatus, wherein the game program is configured to cause the computer to perform operations comprising:

setting a region in a virtual space, based on a user's operation;

displaying a graphical indication of where the region is located within the virtual space;

moving a material object in the virtual space, based on the user's operation; and causing a product relating to a plurality of the material objects to appear with at least a portion of the product included in the region, using at least the material objects having at least a portion included in the region.

2. The non-transitory computer-readable storage medium according to claim 1, wherein the product is an assembled object obtained by putting the plurality of material objects together.

3. The non-transitory computer-readable storage medium according to claim 2, wherein the operations further comprise:

producing the assembled object by putting the plurality of material objects together, based on the user's operation.

4. The non-transitory computer-readable storage medium according to claim 3, wherein the operations further comprise:

setting the produced assembled object as the product allowed to appear.

5. The non-transitory computer-readable storage medium according to claim 4, wherein the assembled object is automatically set as the product.

6. The non-transitory computer-readable storage medium according to claim 5, wherein a first number of the products are allowed to be set, and when the produced assembled object is automatically newly set as the product, then if the first number is exceeded, a relatively early set one of the products already set is automatically deleted.

7. The non-transitory computer-readable storage medium according to claim 6, wherein one from the products already set is allowed to be set as a particular product, based on the user's operation, and when the product is newly set, then even if the first number is exceeded, the particular product continues to be set.

8. The non-transitory computer-readable storage medium according to claim 2, wherein when the user obtains an item in a game, a product relating to the item is set as the product allowed to appear.

9. The non-transitory computer-readable storage medium according to claim 4, wherein the produced assembled object, when designated by the user, is set as the product allowed to appear.

10. The non-transitory computer-readable storage medium according to claim 2, wherein of objects included in the region, the material object that is used to cause the product to appear is displayed in a manner such that the material object is distinguishable.

11. The non-transitory computer-readable storage medium according to claim 2, wherein an image showing the product to be caused to appear obtained by putting a plurality of material objects together is displayed in the region.

12. The non-transitory computer-readable storage medium according to claim 11, wherein of the plurality of material objects constituting the displayed product to be caused to appear, a missing material object for the displayed product to be caused to appear is displayed in a manner such that the missing material object is distinguishable.

13. The non-transitory computer-readable storage medium according to claim 2, wherein when there are not enough material objects to constitute the product to be caused to appear, the product to be caused to appear is caused to appear with the material objects of the product to be caused to appear excluding a missing material object, put together in a same manner as when all the material objects of the product to be caused to appear are put together.

14. The non-transitory computer-readable storage medium according to claim 1, wherein the material objects include a storable object that a player character operated by the user is allowed to temporarily store as a stored object, and a non-storable object that the player character is not allowed to temporarily store as the stored object.

15. The non-transitory computer-readable storage medium according to claim 1, wherein the product is caused to appear using the material object having at least a portion included in the region and a stored object temporarily stored by a player character operated by the user.

16. The non-transitory computer-readable storage medium according to claim 15, wherein when a same object is present both among the material objects having at least a portion included in the region and among the stored objects, the product is caused to appear using the same object that is among the material objects having at least a portion included in the region with higher priority.

17. The non-transitory computer-readable storage medium according to claim 2, wherein a player character operated by the user is disposed in the virtual space, the material object is moved in the virtual space, based on the user's operation performed on the player character, and wherein operations further comprise:

producing the assembled object by putting the plurality of material objects together, based on the movement.

18. The non-transitory computer-readable storage medium according to claim 1, wherein when a player character operated by the user is disposed on a ground, the region is set on the ground in front of the player character, when the player character is disposed on the ground, the product is caused to appear in the region in front of the player character, and when the player character is disposed in the air, the product is caused to appear below the player character.

19. The non-transitory computer-readable storage medium of claim 1, wherein the region is set within the virtual space based on a position of player character within the virtual space.

20. The non-transitory computer-readable storage medium of claim 19, wherein the operations further comprise:

moving the region within the virtual space based on movement of the player character within the virtual space.

21. The non-transitory computer-readable storage medium of claim 1, wherein the region is settable to an arbitrary region within the virtual space based on the user's operation.

22. The non-transitory computer-readable storage medium of claim 1, wherein the region defines a volume of the virtual space that includes at least a height and a width.

23. A game apparatus comprising:
a computer configured to execute:
setting a region in a virtual space, based on a user's operation;
displaying a graphical indication of where the region is located within the virtual space;
moving a material object in the virtual space, based on the user's operation; and
causing a product relating to a plurality of the material objects to appear with at least a portion of the product included in the region, using at least the material objects having at least a portion included in the region.

24. A game system comprising:
a computer configured to execute:
setting a region in a virtual space, based on a user's operation;
displaying a graphical indication of where the region is located within the virtual space;
moving a material object in the virtual space, based on the user's operation; and
causing a product relating to a plurality of the material objects to appear with at least a portion of the product included in the region, using at least the material objects having at least a portion included in the region.

25. A game processing method comprising:
setting a region in a virtual space, based on a user's operation;
displaying a graphical indication of where the region is located within the virtual space;
moving a material object in the virtual space, based on the user's operation; and
causing a product relating to a plurality of the material objects to appear with at least a portion of the product included in the region, using at least the material objects having at least a portion included in the region.

* * * * *